US012638609B2

(12) United States Patent
Lee et al.

(10) Patent No.: US 12,638,609 B2
(45) Date of Patent: May 26, 2026

(54) APPARATUS AND METHOD FOR CALIBRATING TILT SENSOR AND COMPASS OF SENSOR DEVICE FOR MAGNETIC ORIENTATION

(71) Applicant: United States of America as Represented by The Secretary of The Army, Alexandria, VA (US)

(72) Inventors: Rebekah F Lee, Vicksburg, MS (US); Rongmao Zhou, Vicksburg, MS (US); Gustavo Galan-Comas, Vicksburg, MS (US); Roland Fuentes, Meridianville, AL (US); Lawrence Watkins, Meridianville, AL (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 0 days.

(21) Appl. No.: 17/735,927

(22) Filed: May 3, 2022

(65) Prior Publication Data

US 2023/0408722 A1 Dec. 21, 2023

(51) Int. Cl.
*G01V 13/00* (2006.01)
*G01V 1/16* (2006.01)
*G01V 1/18* (2006.01)

(52) U.S. Cl.
CPC .............. *G01V 13/00* (2013.01); *G01V 1/162* (2013.01); *G01V 1/181* (2013.01)

(58) Field of Classification Search
CPC ......... G01V 13/00; G01V 1/162; G01V 1/181
See application file for complete search history.

(56) References Cited

U.S. PATENT DOCUMENTS 4,838,379 A * 6/1989 Maxwell .................. G01V 1/16
33/351
5,512,905 A * 4/1996 Nichols .................. G01C 15/06
342/357.29

(Continued)

FOREIGN PATENT DOCUMENTS

CN 201688843 U * 12/2010
EP 3358123 A1 * 8/2018 .............. E02D 7/22

*Primary Examiner* — Octavia Hollington
(74) *Attorney, Agent, or Firm* — Brian C Jones

(57) ABSTRACT

A calibration apparatus for calibrating a compass and/or tilt sensor module includes a longitudinal support having a support axis; a first longitudinal member coupled to the longitudinal support to be rotatable around the support axis relative to the longitudinal support and a second longitudinal member connected to the first longitudinal member to be rotatable around a second longitudinal member axis relative to the first longitudinal member. The second longitudinal member axis is perpendicular to the support axis. A third longitudinal member is coupled to the second longitudinal member to be rotatable around a third longitudinal member axis relative to the second longitudinal member, rotatable with the second longitudinal member relative to the first longitudinal member, and rotatable with the first longitudinal member relative to the longitudinal support. The third longitudinal axis is perpendicular to the second longitudinal member axis. The module is connected to the third longitudinal member.

5 Claims, 30 Drawing Sheets

(56)　　　　　　　References Cited

U.S. PATENT DOCUMENTS

| | | | |
|---|---|---|---|
| 6,970,247 B2 * | 11/2005 | Yankielun ............. | G01M 10/00 |
| | | | 385/12 |
| 7,646,339 B2 * | 1/2010 | Green ................... | G01C 15/00 |
| | | | 342/357.29 |
| 8,125,379 B2 * | 2/2012 | Allison ................. | G01C 15/00 |
| | | | 342/357.47 |
| 9,163,774 B2 * | 10/2015 | Orlov .................... | F16M 11/34 |
| 10,168,153 B2 * | 1/2019 | Grässer ................. | G01C 15/06 |
| 2023/0358906 A1 * | 11/2023 | Lee ........................ | E21B 41/00 |

* cited by examiner

WT-901 circuit board and compass reading output format

Arrow direction points to the Compass reading center line. If pointed North (Y) readout is 0. Readout range +- 180

WT-901 XYZ, Compass Module 220

Example of magnetic declination Showing a compass needle with a "positive" (or "easterly") variation from geographic north. Ng is geographic or true north, Nm is magnetic north, and ) $\delta$ is magnetic declination.

Tilt output values in the X axis for WT-61 and WT-901 circuit boards
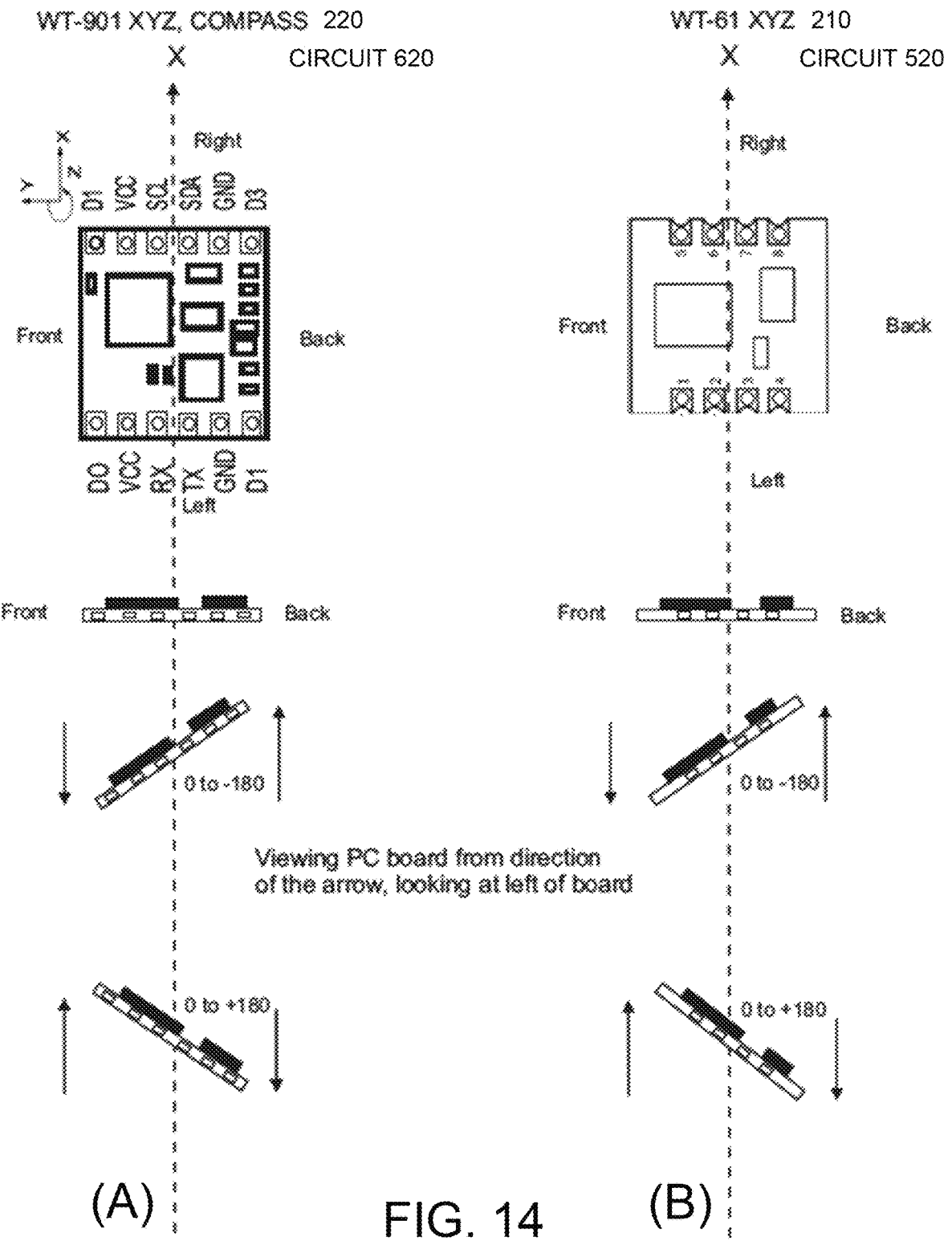
(A)    FIG. 14    (B)

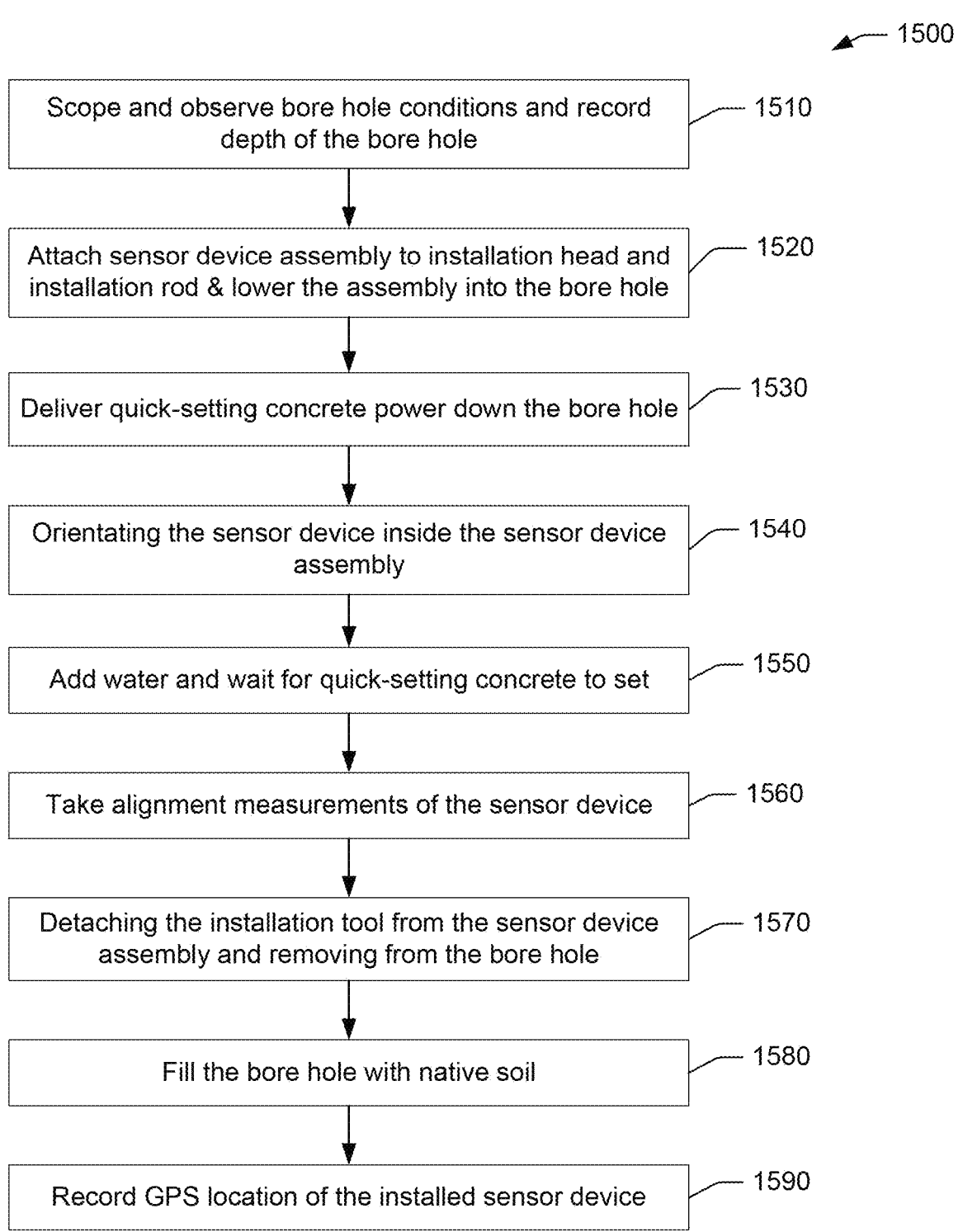

— 1500

Scope and observe bore hole conditions and record depth of the bore hole — 1510

Attach sensor device assembly to installation head and installation rod & lower the assembly into the bore hole — 1520

Deliver quick-setting concrete power down the bore hole — 1530

Orientating the sensor device inside the sensor device assembly — 1540

Add water and wait for quick-setting concrete to set — 1550

Take alignment measurements of the sensor device — 1560

Detaching the installation tool from the sensor device assembly and removing from the bore hole — 1570

Fill the bore hole with native soil — 1580

Record GPS location of the installed sensor device — 1590

FIG. 15

Calibration of WT-901 compass, tilt module 220

First Pole Section (A)

(B)

Machined Line 2120

Top View

Y

1940

1920

X

Foward

Y (sensor rotated 90 deg)

1920

1940

Z Calibration

APPARATUS AND METHOD FOR CALIBRATING TILT SENSOR AND COMPASS OF SENSOR DEVICE FOR MAGNETIC ORIENTATION

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees.

BACKGROUND

Field of the Invention

The present invention relates to apparatus and methods of installing a sensor device and, more particularly, installing a sensor device in a borehole on the ground to achieve a known magnetic orientation of the installed sensor device.

Description of the Related Art

This section introduces aspects that may help facilitate a better understanding of the invention. Accordingly, the statements of this section are to be read in this light and are not to be understood as admissions about what is prior art or what is not prior art.

The orientation of a sensor device such as a three-component seismic sensing geophone must be known and consistent with any other sensors installed as part of an array to achieve accurate sensor measurements. In seismology, sensors are often oriented with respect to geographic north as this allows for consistency across sensing stations around the globe. Knowing the inclination for a local area, three-component (3C) sensors can be aligned using a compass and adding or subtracting by the declination, as appropriate, to adjust from magnetic to geographic north. When the 3C sensor is installed in a borehole, however, it is a challenge to achieve a known magnetic orientation, as the sensor must be installed using some kind of apparatus and cannot be adjusted by hand. Ideally, during placement of the 3C sensor, the 3C sensor maintains a level orientation (e.g., vertically straight) while being inserted into a straight borehole. In reality, however, errors occur when the sensor is rotated during installation, the borehole is not straight (e.g., angled) and/or the 3C sensor is tilted at an angle with respect to the installation tool during insertion. While the operator on the surface may believe the 3C sensor is being installed at a certain bearing (e.g., magnetic North or true North) and is perfectly leveled, in reality the 3C sensor may be off from the bearing and is tilted inside the borehole. Errors in installation of the 3C sensor will result in errors in measurement by the 3C sensor, rendering the sensing results unreliable or useless.

SUMMARY

The present invention was developed to address the desire for an apparatus and a method for installing a sensor device into a borehole to allow for orientation of the sensor so that it is both level and aligned to a common direction (e.g., geographic North). The sensor being installed may deviate in tilt either from an angled borehole, or an angled sensor caused by a slight disjoining of the installation apparatus with the sensor, or both. It is further desirable that the installed sensor device has precise coordinates and good sensor coupling to provide sensor measurement results outside of the borehole. An example of the sensor device is a three-component (e.g., vertical, horizontal north and horizontal east) geophone, and the geophone sensor is installed vertically inside a borehole into the ground.

An aspect of the present invention is directed to a calibration apparatus for field calibration of a module having at least one of a compass or a tilt sensor. The calibration apparatus comprises: a longitudinal support having a longitudinal support axis; a first longitudinal member rotatably coupled to the longitudinal support to be rotatable around the longitudinal support axis relative to the longitudinal support; a second longitudinal member connected to the first longitudinal member to be rotatable around a second longitudinal member axis relative to the first longitudinal member, and to be rotatable with the first longitudinal member around the longitudinal support axis relative to the longitudinal support, the second longitudinal member axis being perpendicular to the longitudinal support axis; and a third longitudinal member rotatably coupled to the second longitudinal member to be rotatable around a third longitudinal member axis relative to the second longitudinal member, to be rotatable with the second longitudinal member relative to the first longitudinal member, and to be rotatable with the first longitudinal member around the longitudinal support axis relative to the longitudinal support, the third longitudinal axis being perpendicular to the second longitudinal member axis. The module is to be connected to the third longitudinal member to be rotatable with the third longitudinal member around the third longitudinal member axis relative to the second longitudinal member, to be rotatable with the second longitudinal member relative to the first longitudinal member, and to be rotatable with the first longitudinal member around the longitudinal support axis relative to the longitudinal support.

Another aspect of the invention is directed to a calibration method for field calibration of a module having at least one of a compass or a tilt sensor. The calibration method comprises: rotatably coupling a first longitudinal member to a longitudinal support to be rotatable around a longitudinal support axis of the longitudinal support; connecting a second longitudinal member to the first longitudinal member to be rotatable around a second longitudinal member axis relative to the first longitudinal member, and to be rotatable with the first longitudinal member around the longitudinal support axis relative to the longitudinal support, the second longitudinal member axis being perpendicular to the longitudinal support axis; rotatably coupling a third longitudinal member to the second longitudinal member to be rotatable around a third longitudinal member axis relative to the second longitudinal member, to be rotatable with the second longitudinal member relative to the first longitudinal member, and to be rotatable with the first longitudinal member around the longitudinal support axis relative to the longitudinal support, the third longitudinal axis being perpendicular to the second longitudinal member axis; and connecting the module to the third longitudinal member to be rotatable with the third longitudinal member around the third longitudinal member axis relative to the second longitudinal member, to be rotatable with the second longitudinal member relative to the first longitudinal member, and to be rotatable with the first longitudinal member around the longitudinal support axis relative to the longitudinal support.

Another aspect of this invention is directed to a calibration apparatus for field calibration of a module having at least one of a compass or a tilt sensor. The calibration apparatus comprises: a first longitudinal member extending along and rotatable around a first longitudinal member axis; a second longitudinal member extending along a second longitudinal member axis and connected to the first longitudinal member to be rotatable around the second longitudinal member axis relative to the first longitudinal member, the second longitudinal member axis being perpendicular to the first longitudinal member axis; a third longitudinal member extending along a third longitudinal member axis and coupled to the second longitudinal member to be rotatable around the third longitudinal member axis relative to the second longitudinal member, the third longitudinal axis being perpendicular to the second longitudinal member axis, the module to be attached to the third longitudinal member to be rotatable with the third longitudinal member around the third longitudinal member axis relative to the second longitudinal member; and a mechanism for connecting the first longitudinal member, the second longitudinal member, and the third longitudinal member, to rotate independently the module attached thereto around three vertical axes of the module.

In accordance with another aspect of this invention, a method for installing a sensor device to achieve a known magnetic orientation of the sensor device comprises: attaching a distal tilt sensor to the sensor device; detachably connecting an installation tool to the sensor device at or near a distal end of the installation tool; attaching an orientation sensor to the installation tool at a location proximal of the distal end of the installation tool toward a proximal end of the installation tool, the orientation sensor including a compass and a proximal tilt sensor; lowering the sensor device into the borehole; orientating the sensor device to achieve a known magnetic orientation of the sensor device based on the compass and tilt sensor measurements from the compass, the proximal tilt sensor, and the distal tilt sensor; and setting the sensor device fixed in position inside the borehole.

BRIEF DESCRIPTION OF THE DRAWINGS

Embodiments of the invention will become more fully apparent from the following detailed description, the appended claims, and the accompanying drawings in which like reference numerals identify similar or identical elements.

FIG. 14 is an example of tilt output values in the X axis for (A) the orientation sensor circuit and (B) the tilt sensor circuit.

FIG. 15 is an example of a flow diagram illustrating a sensor device installation process.

FIG. 27 illustrates an example of X calibration of the module using the calibration apparatus.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
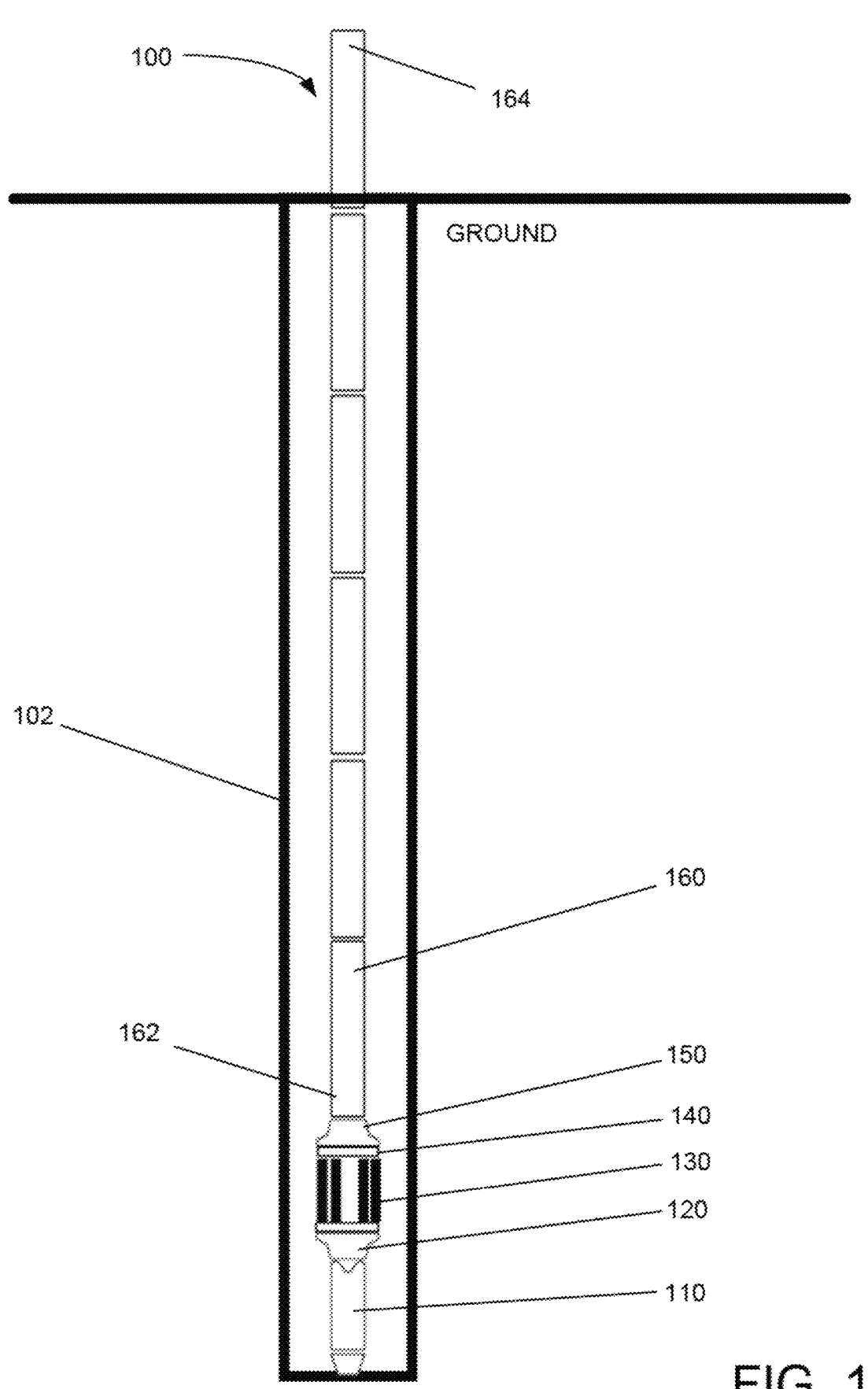
FIG. 1 illustrates a front elevational view of an installation apparatus for installing a sensor device to achieve a known magnetic orientation of the sensor device according to an embodiment of the present invention.

Embodiments of the present invention provide apparatus and methods of installing a sensor device such as a 3C geophone sensor in a borehole on the ground to achieve a known magnetic orientation of the installed sensor device.
Sensor Device Installation Apparatus FIG. 1 illustrates a front elevational view of an installation apparatus 100 for installing a sensor device to achieve a known magnetic orientation of the sensor device according to an embodiment of the present invention. A borehole 102 is prepared in the ground which may be a vertical hole of a substantial depth. For instance, the depth may be several times to over ten times the size of the sensor device 110 to be installed (e.g., over 1 meter deep). The sensor device 110 may be a three-component (3C) sensor such as a triaxial geophone 110 housed in sensor hardware that includes, for example, a sensor device casing or housing 120. A plurality of support rods 130 (e.g., four) and a metal plate 140 are attached to the sensor device housing 120 and together form a sensor device assembly that moves as one. The support rods 130 and metal plate 140 provide a mechanism to attach the sensor device 110 to an installation tool for installing the sensor device 110 into the borehole 102.

The installation tool includes an installation head 150 that attaches to and detaches from the sensor hardware. In one embodiment as shown, the installation head 150 is a magnetic head that provides a magnetic breakaway connection to the metal plate 140. An installation rod 160 is attached to the installation head 150 to lower the sensor device assembly into the borehole 102. The rod 160 may include a plurality of tool/rod segments extending from a distal end 162 at the installation head 150 to a proximal end 164 exposed above the ground. The installation rod 160 also serves as a conduit for water into the borehole to mix with the quick-setting concrete to set concrete on the installed sensor device assembly. The support rods 130 and metal plate 140 facilitate installation of the sensor device 110 and, as part of the sensor device assembly, stay underground with the installed sensor device 110 and casing 120. The installation head 150 and installation rod 160 are part of the overall installation system that is detached from the sensor device assembly and removed from the ground.

Before installing the sensor device 110, the operator scopes and observes the borehole conditions and records the depth of the borehole 102. The operator attaches the sensor device assembly to the magnetic installation head 150 and the installation rod 160. The sensor device 110 is a three component (3C) sensor having a vertical component and two horizontal components. The operator may add tool/rod segments to the installation rod 160 to increase its length to place the 3C sensor 110 at the bottom of the borehole 102. The operator then lowers or delivers quick-setting concrete powder down the borehole 102 and orientates the 3C sensor 110 before adding water and waiting for the quick-setting concrete to set. The 3C sensor 110 is magnetically orientated and aligned by manipulating the installation rod 160 from outside the borehole 102. The operator may make use of a digital compass on the surface and align it with a ribbon etched into each rod 130 that aligns with the Y axis of the 3C sensor. After setting of the concrete, the operator may take alignment measurements of the 3C sensor 110 again using the digital compass. After confirming that the 3C sensor 110 is planted, the operator pulls up the installation tool and may fill in the borehole 102 with native soil. The operator records the GPS (Global Positioning System) location of the 3C sensor 110.

A proper installation is achieved when there is good sensor coupling to provide sensor measurement results outside of the borehole, a known orientation of the 3C sensor (e.g., aligned to a common direction and at or near level orientation (less than 2% tilt in either of the tilt axes), and precise coordinates of the installed 3C sensor 110. The installation apparatus of the present invention is configured to facilitate such proper installations.

Figures 2A, 2B:
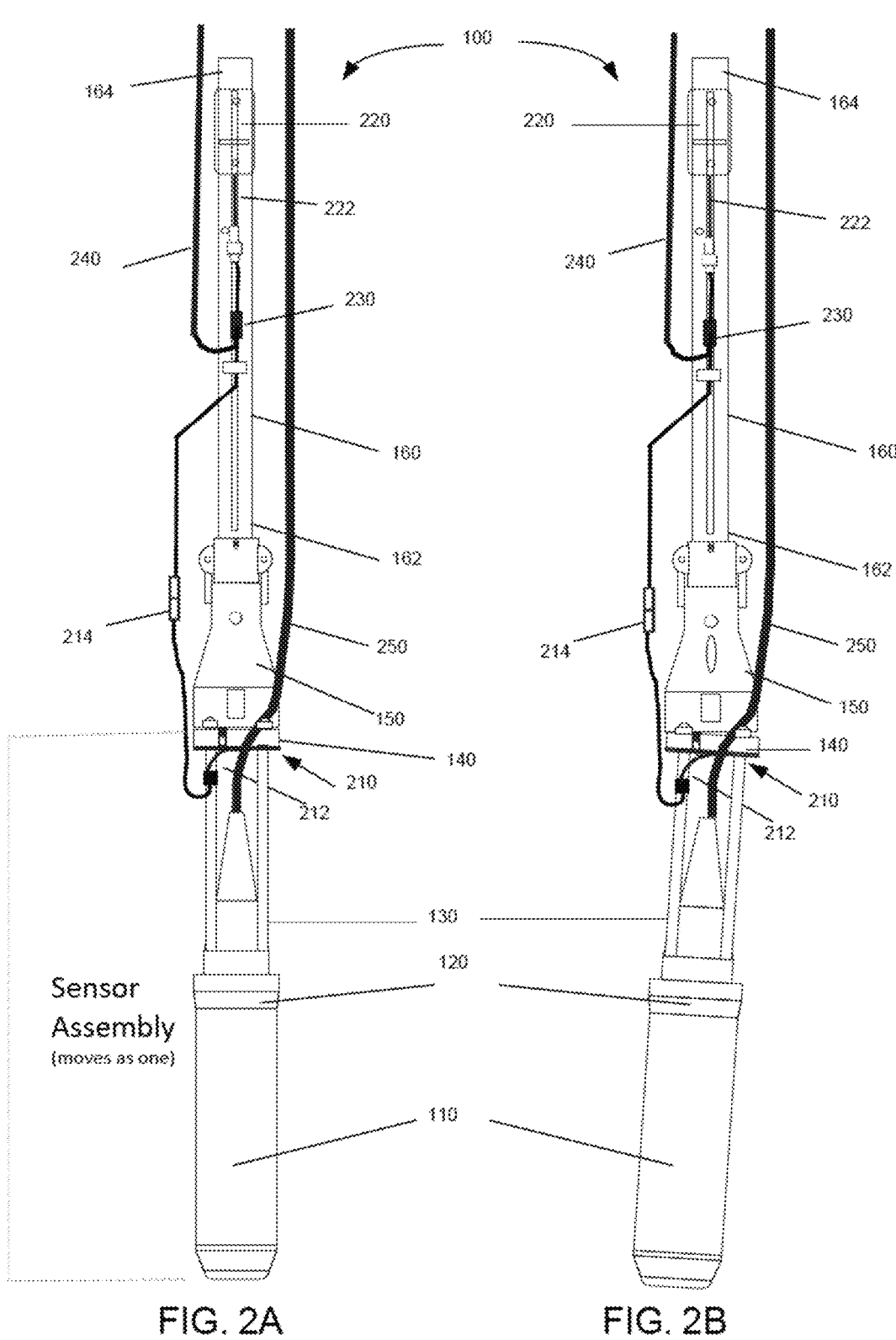
FIG. 2A is a front elevational view showing additional details of the installation apparatus of FIG. 1 including the use of a tilt sensor on the sensor device to be installed near the distal end of the installation rod and a compass and tilt sensor near the proximal end of the installation rod.
FIG. 2B is a front elevational view of the installation apparatus of FIG. 2A illustrating an angled sensor device which is tilted during installation.

FIG. 2A is a front elevation view showing additional details of the installation apparatus 100 of FIG. 1. It includes the use of a tilt sensor 210 (also referred to as distal tilt sensor) on the 3C sensor 110 to be installed near the distal end 162 of the installation rod 160 (e.g., within a few cm) and an orientation sensor 220 near the proximal end 164 of the distal section of the installation rod 160 (e.g., within a few cm). The orientation sensor 220 may include a compass and a tilt sensor (also referred to as proximal tilt sensor) to achieve a known magnetic orientation of the installation rod 160 and measure any tilting of the installation rod 160.

A tilt sensor cable 212 connects the tilt sensor 210 via a breakaway cable 214 and splice 230 to a major cable 240 which leads to the surface above ground. A proximal sensor cable 222 connects the orientation sensor 220 via a splice 230 to the major cable 240. A sensor cable 250 (also referred to as geophone cable) is connected via the sensor device casing 120 to the 3C sensor 110 and leads to the surface above ground. A proper installation will result in alignment of the tilt sensor 210 and the orientation sensor 220 vertically in the borehole 102. Tilt sensors are used to measure the tilt in multiple axes of a reference plane. They measure the tilting position with reference to gravity. Tilt sensors and digital compasses are commercially available.

FIG. 2B is a front elevation view of the installation apparatus 100 of FIG. 2A illustrating an angled 3C sensor 110 which becomes tilted during installation. The 3C sensor 110 is tilted relative to the installation tool and they are no longer aligned vertically in the borehole 102. The tilting can happen even if the borehole 102 is straight and the sensor device assembly and the installation tool are lowered into the borehole 102 carefully.

As described above, the 3C sensor 110 is magnetically orientated and aligned by manipulating the installation rod 160 from outside the borehole 102, for instance, by twisting around a vertical axis and/or moving the installation apparatus back and forth laterally until the compass and tilt sensor 220 and the distal tilt sensor 210 show that the 3C sensor is in the correct alignment. The tilt sensor 210 and the orientation sensor 220 are used to measure the magnetic orientation and tilt of the 3C sensor 110 during installation. They ensure that the 3C sensor 110 is aligned with the installation tool and with vertical and is magnetically orientated with respect to a known direction such as the earth's magnetic poles. The tilt sensor 210 and the orientation sensor 220 enable the operator to monitor in real time the tilt relationship between the tilt sensor 210 and the orientation sensor 220 and the tilt of these sensors to vertical. Mitigating the tilt ensures that the installed 3C sensor 110 is level.

In the embodiment shown, the tilt sensor 210 is attached or affixed to the metal plate 140 (also referred to as the distal tilt sensor plate) of the sensor device assembly at or near the distal end 162 of the installation rod 160 (e.g., within a few cm). The orientation sensor 220 is attached to the same segment of the installation rod 160 near its proximal end 164, at least 18 inches away from the magnetic head 150, to measure tilt and magnetic orientation of the installation rod 160. In this way, the compass of the orientation sensor 220 does not suffer from magnetic interference by the magnetic field of the magnetic installation head 150 that is used to temporarily connect to the sensor device assembly via a breakaway magnetic connection. The tilt sensor 210 may be embedded in the metal plate 140 to measure tilt of the sensor device assembly and stays with the sensor device assembly in the borehole 102 after installation.

Figures 3A, 3B, 3C:
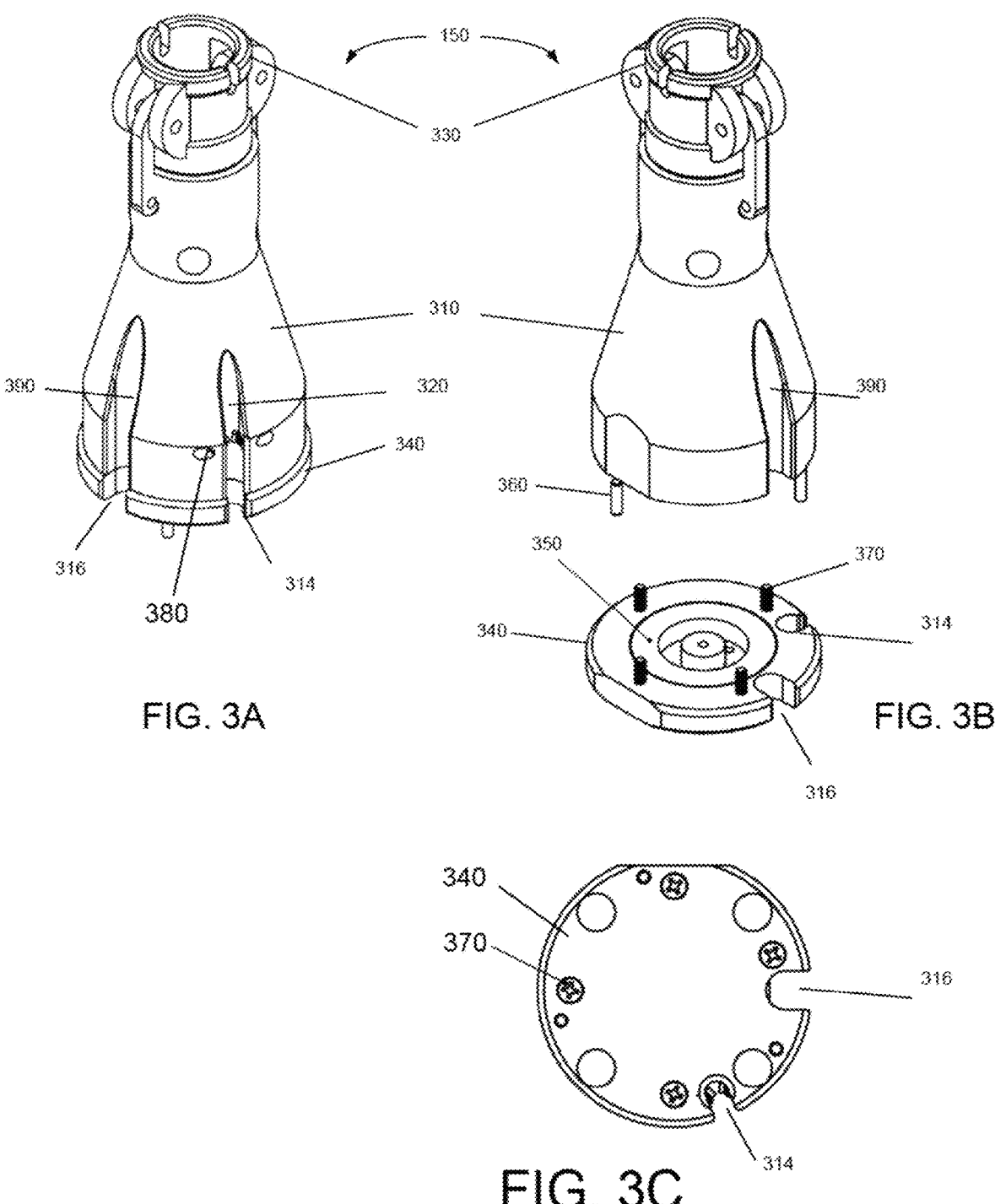
FIG. 3A is a perspective view of an installation head according to an embodiment.
FIG. 3B is an exploded perspective view of the installation head of FIG. 3A.
FIG. 3C is a plan view of a magnetic retainer of the installation head of FIG. 3A.

FIG. 3A is a perspective view of an installation head 150 according to an embodiment. FIG. 3B is an exploded perspective view thereof. The installation head 150 may be a magnetic head. It includes a body 310, a slot for a borescope camera 320, a slot 390 to accommodate the cable 250 for the 3C sensor 110, a socket 330 (e.g., a modified camlock socket), a magnetic alignment ring 340, a magnetic retainer 350, three dowel pins 360 (e.g., to align with the metal plate 140), four screws 370 (e.g., Phillips flat head screws), and one set screw 380 (e.g., nylon-tip set screws). The magnetic alignment ring 340 contains a slot 314 that is slightly larger than a specific borescope camera to prevent the camera from binding as well as a slot 316 to accommodate the 3C sensor cable 250. FIG. 3C is a plan view of a magnetic alignment ring 340 of the installation head of FIG. 3A. The screws 370 attach the magnetic alignment ring 340 to the body 310. The magnetic alignment ring 340 and magnetic retainer 350 form a magnetic member or magnetic plate to provide a magnetic breakaway connection with the metal plate 140.

Figure 4:
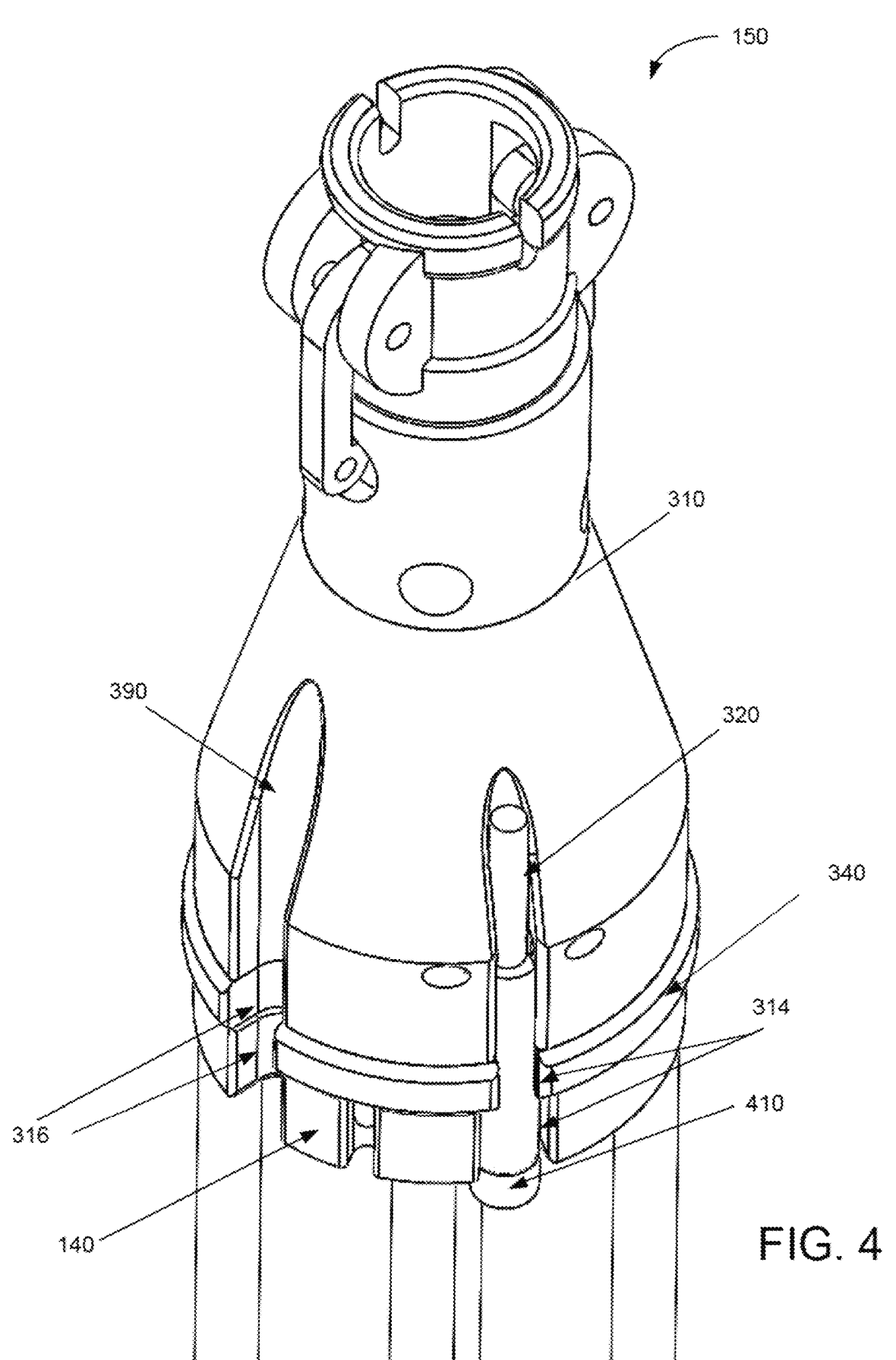
FIG. 4 is a lower perspective view of the installation head showing the camera slot for mounting a borehole camera and the slot to accommodate the cable of the three-component (3C) sensor.

FIG. 4 is a lower perspective view of the installation head 150 showing the camera slot 320 for mounting a borehole camera 410. There may be one or more slots. This example shows one camera slot 320, one slot 390 to accommodate the 3C sensor cable 250, and a camera 410 mounted to the camera slot 320 and pointed downward in the direction of the borehole 102. The camera slot(s) provided on the installation head 150 may be configured differently to receive and mount cameras of different sizes or shapes. The magnetic alignment ring 340 and the metal plate 140 each have slots 314 and 316 to accommodate the sensor cable 250 and borescope camera 410.

Figure 5:
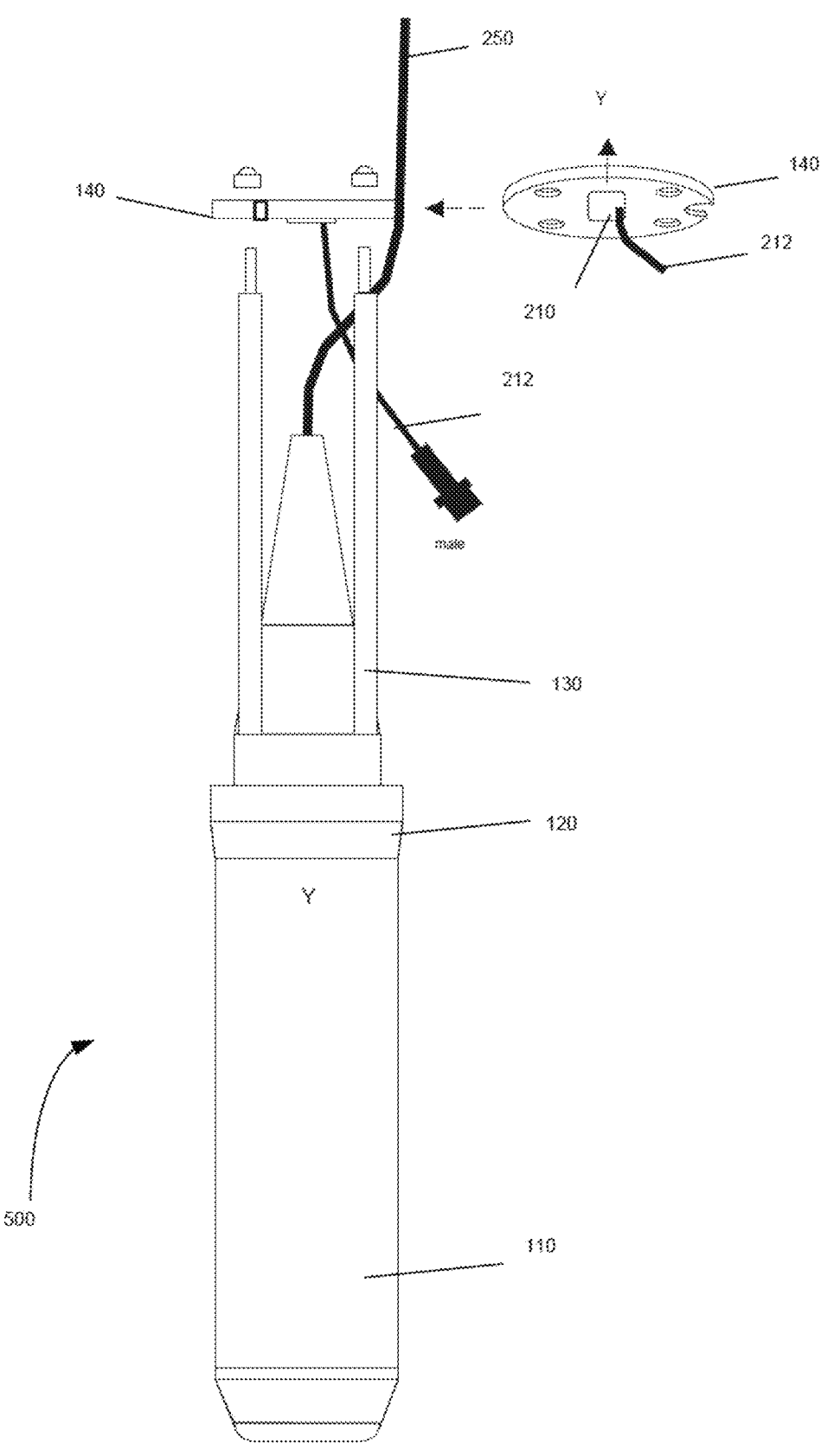
FIG. 5 is a view of the sensor device assembly showing attachment/removal of the tilt sensor.

FIG. 5 is a view of the sensor device assembly 500 showing attachment of the tilt sensor 210. The tilt sensor or tilt sensor module 210 includes a tilt sensor coupling plate 140, a tilt sensor circuit 210 affixed to the tilt sensor coupling plate 140, and a tilt sensor cable 212 connecting the tilt sensor circuit 210 to the major cable 240 via the breakaway connector 214 and splice 230 in FIG. 2. The support rods 130 may have threaded ends that are connected to the metal plate 140 by threaded nuts. The sensor or geophone cable 250 is connected via the sensor device casing 120 to the sensor device 110. FIG. 5 shows the Y axis to which the sensor device 110 is pointed (out of the page). The Y axis is a known direction such as true North. The components shown in FIG. 5 may be considered disposable and be left in the borehole 102 permanently.

Figure 6:
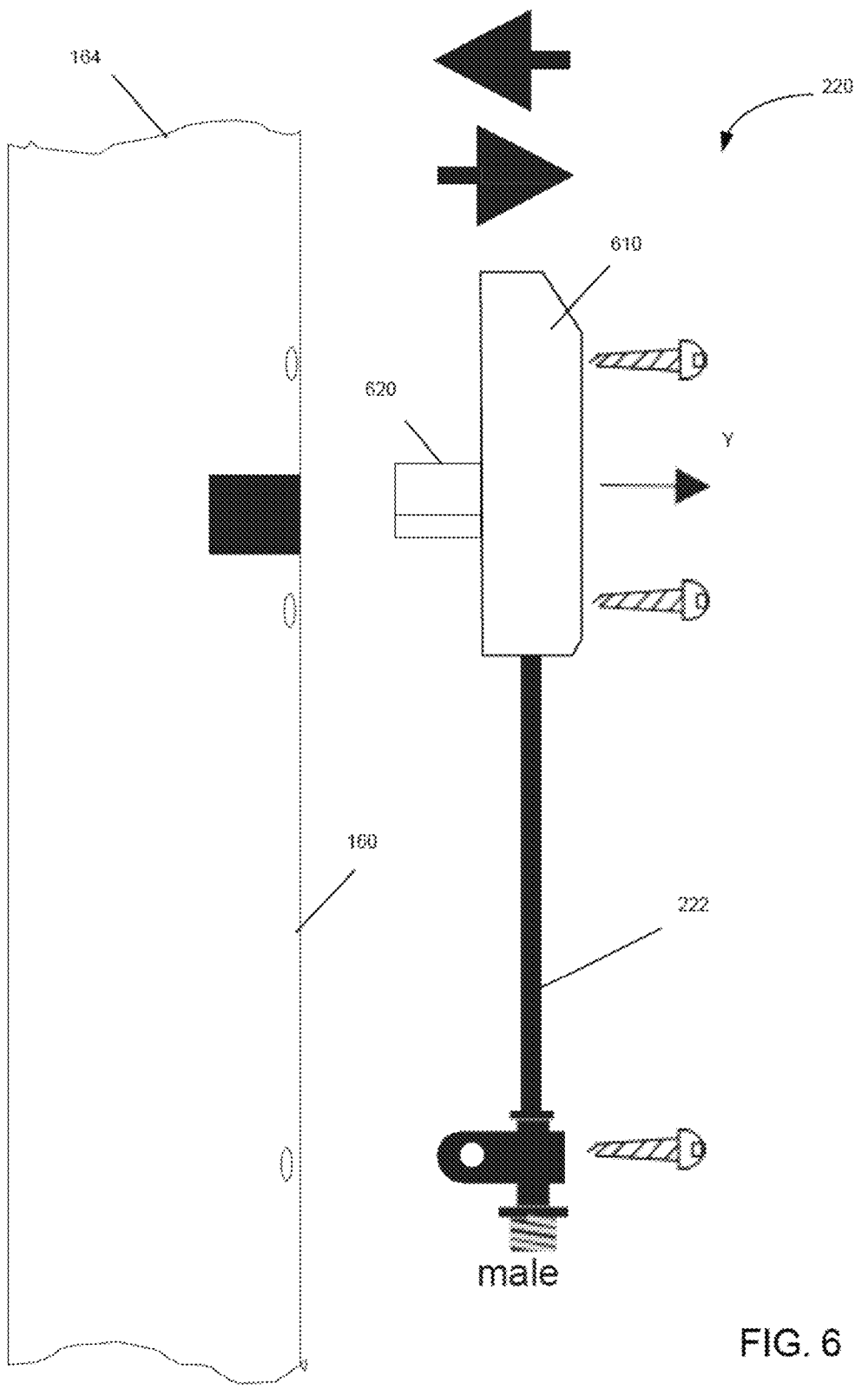
FIG. 6 is a view of the installation bar near the proximal end showing attachment of the orientation sensor.

FIG. 6 is a view of the installation bar 160 near the proximal end 164 of the distal segment of the installation tool showing attachment of the orientation sensor 220 (e.g., compass and tilt sensor). The orientation sensor or orientation sensor module 220 includes an orientation sensor coupling plate 610, an orientation sensor circuit 620 affixed to the orientation sensor coupling plate 610, and an orientation sensor cable 222 connecting the orientation sensor circuit 620 to the major cable 240 via the splice 230 in FIG. 2. Fasteners such as three screws are used to attach the orientation sensor module 220 to the installation bar 160. The Y axis to which the 3C sensor 110 is pointed is shown pointing to the right side of the page.

Figure 7:
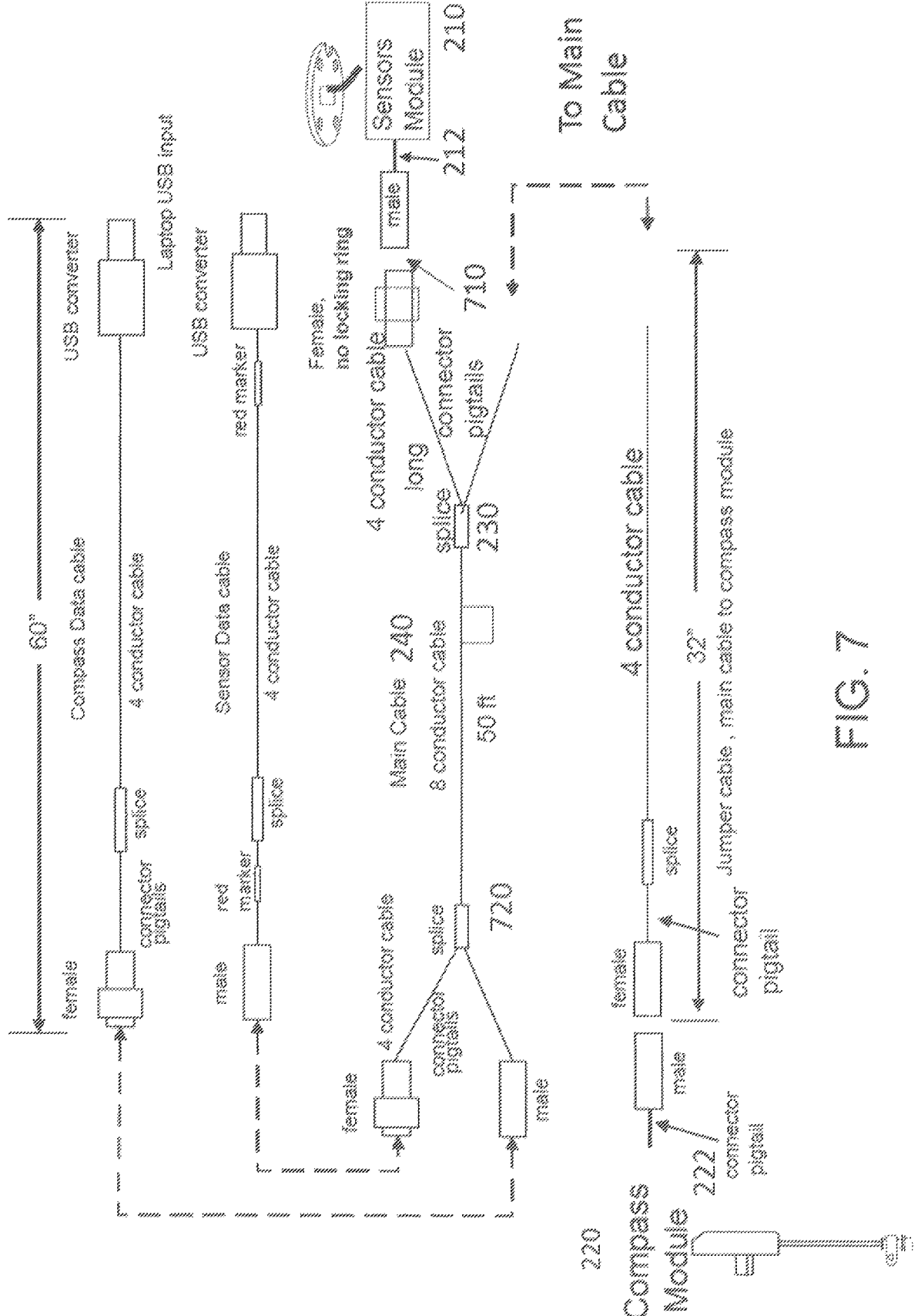
FIG. 7 illustrates details of the cable connections between the tilt sensor module and a laptop computer at the surface above ground and of the cable connections between the orientation sensor module and the laptop computer at the surface above ground.

FIG. 7 illustrates details of the cable connections between the tilt sensor module 210 and a laptop computer at the surface above ground and of the cable connections between the orientation sensor module 220 and the laptop computer at the surface above ground. The cable connectors 710 may be modified to form breakaway connections such as the breakaway cable connection 214 shown in FIG. 2. The two lines of cables for the tilt sensor module 210 and the compass module 220 are combined into a main cable 240. Each end of the main cable 240 contains a splice 230 to combine the lines on the distal end and a splice 720 to separate the two lines of cables on the proximal end connecting to the computer on the surface.

Figure 8:
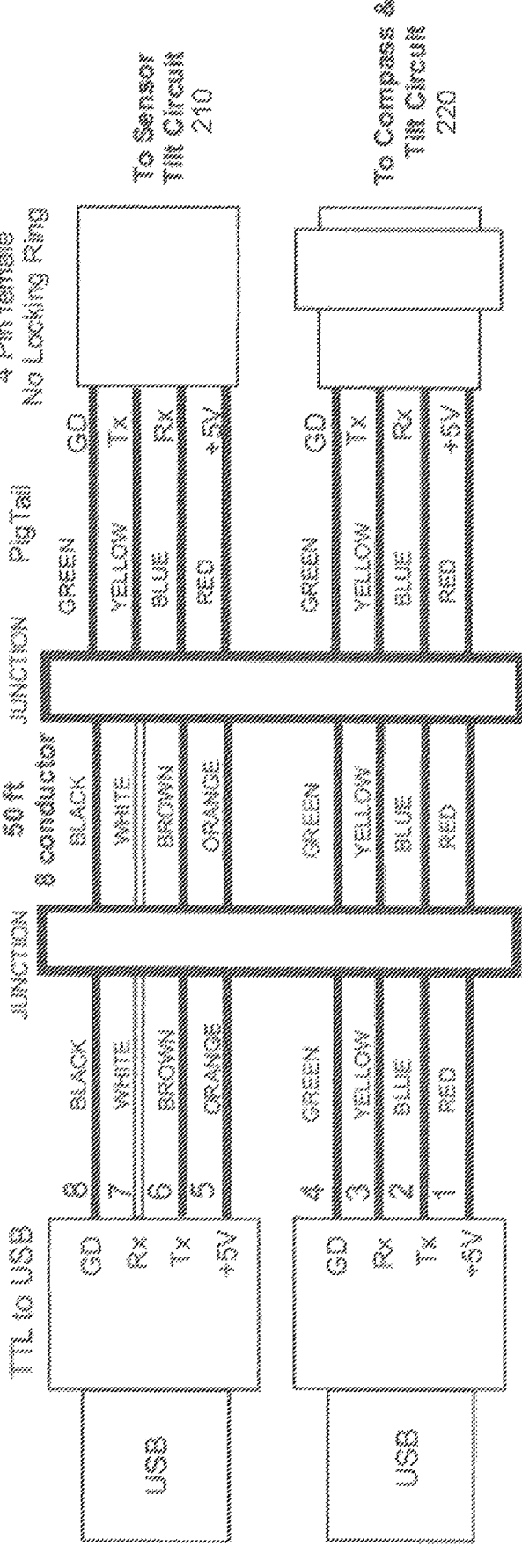
FIG. 8 illustrates an example of cable lines connecting the tilt sensor module and the computer and of cable lines connecting the orientation sensor module and the computer at the surface above ground.

FIG. 8 illustrates an example of cable lines connecting the tilt sensor module 210 and the computer, and of cable lines connecting the orientation sensor module 220 (compass & tilt) and the computer at the surface above ground. They each include a ground cable line GD, a voltage line +5V, a transmission line Tx and a receiver line Rx.

Figure 9:
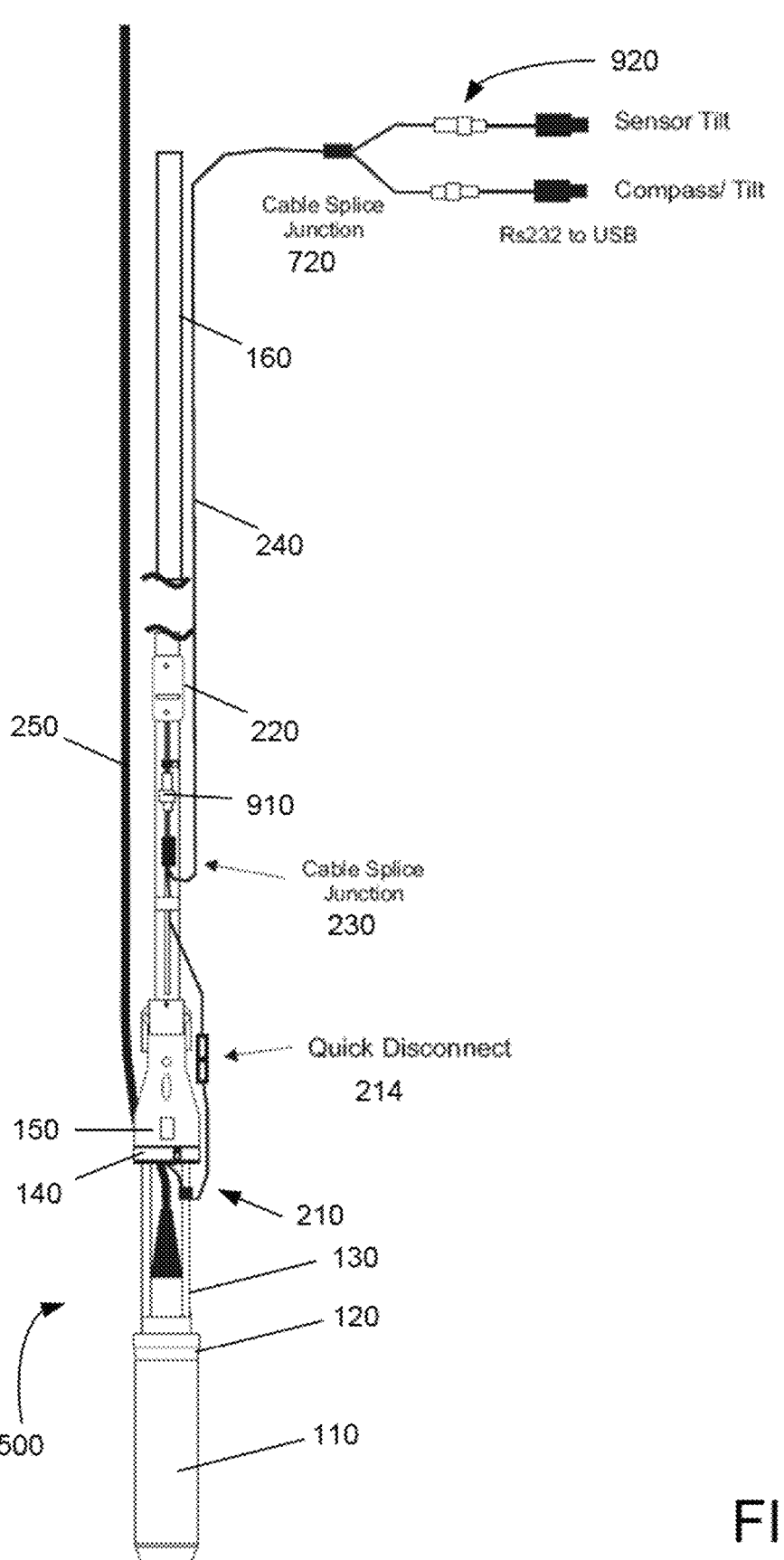
FIG. 9 is a view of the sensor device assembly and installation tool illustrating another example of the cable connections

FIG. 9 is a view of the sensor device assembly 500 and installation tool illustrating a complete overview of the cables. A distal cable splice junction 230 is connected to the tilt sensor 210 via a quick disconnect 214 and connected to the orientation sensor 220 via a locking male-female connector 910. A main cable 240 connects the distal cable splice junction 230 to a proximal cable splice junction 720. The proximal cable splice junction 720 is connected via a pair of male-female connectors 920 to USB connectors for connecting with a computer to communicate with the tilt sensor 210 and the orientation sensor 220, respectively.

Figure 10:
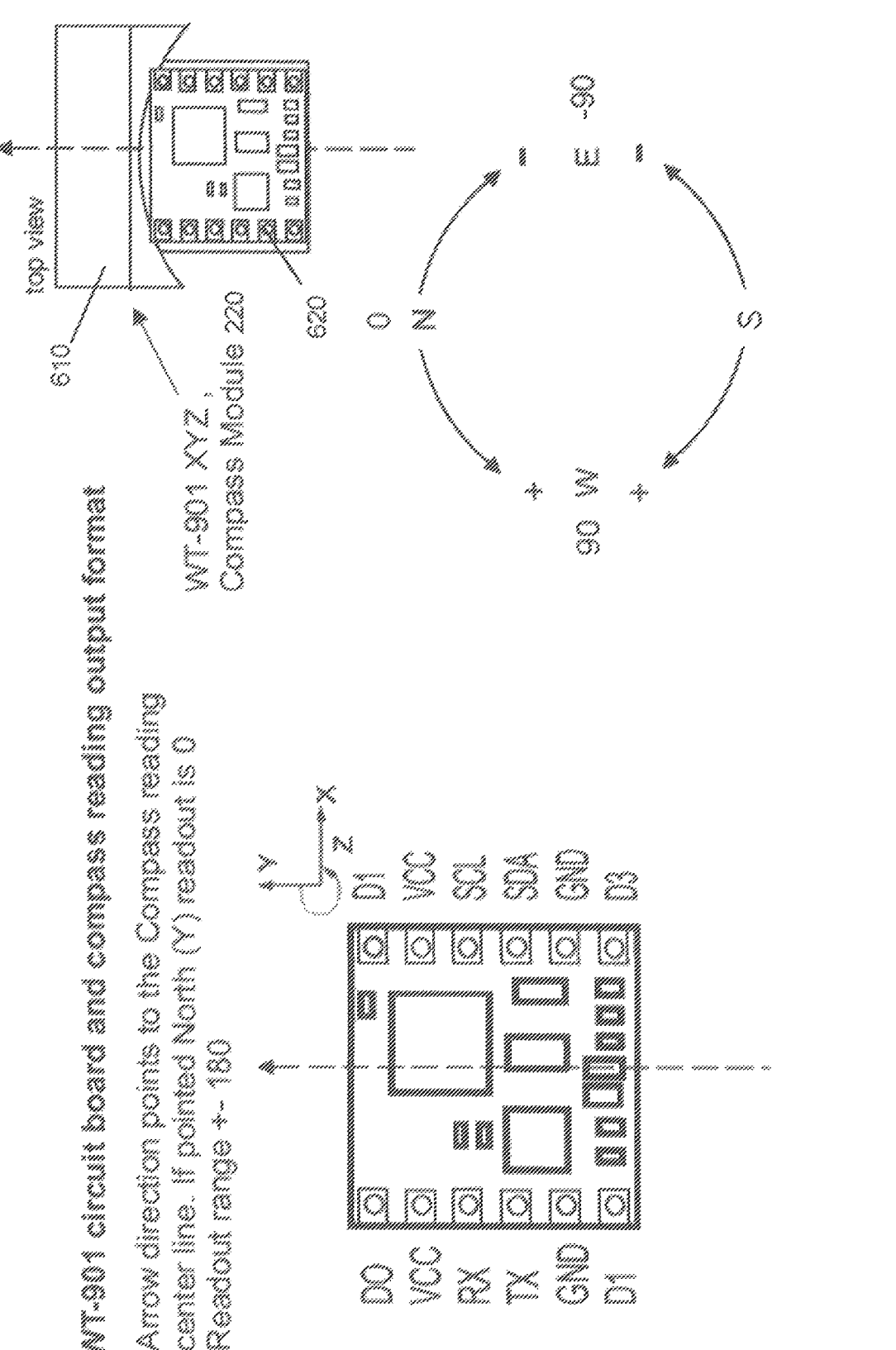
FIG. 10 is an example of the orientation sensor circuit of the orientation sensor.

FIG. 10 is an example of the orientation sensor circuit 620 affixed to the coupling plate 610 of the orientation sensor 220. In this example, the Y axis of the orientation sensor 220 is configured to point to true North. The arrow direction points towards Y to the compass reading center line and has a readout range of ±180 degrees. The WT-901 circuit board shown for the orientation sensor circuit 620 is commercially available, but any suitable circuit may be used.

Figure 11:
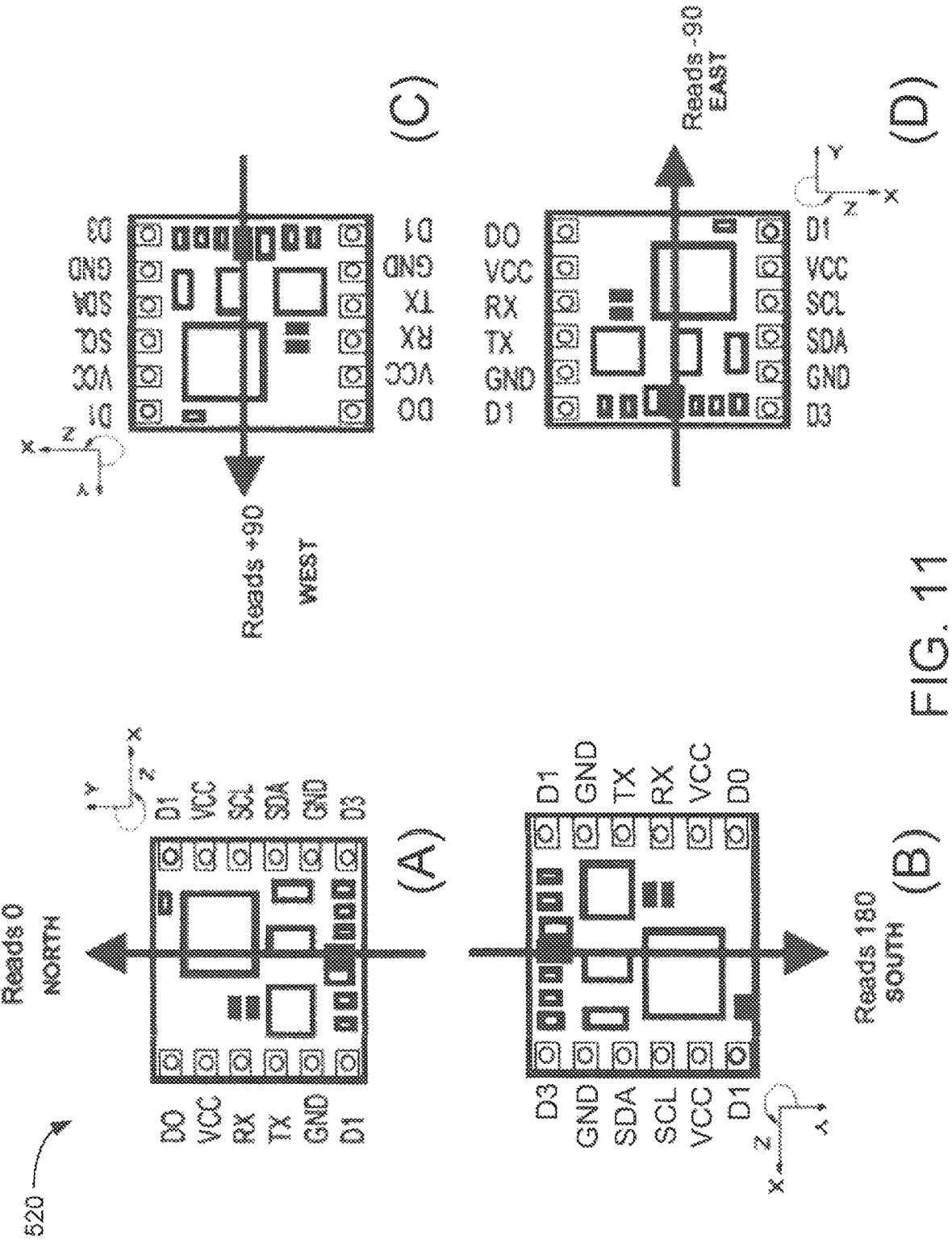
FIG. 11 is an example of a compass reading output format for the orientation sensor circuit showing (A) North, (B) South, (C) West, and (D) East.

FIG. 11 is an example of a compass reading output format for the orientation sensor circuit 520. If the arrow direction points to North (Y axis), the compass readout will be 0. The compass readout is (A) 0 for North, (B) 180 for South, (C) +90 for West, and (D) −90 for East.

The orientation sensor circuit 620 is used to measure the direction of the Y axis toward which the sensor device 110 (e.g., a 3C geophone sensor) is pointed. Because the installation rod 160 may twist while in the borehole 102, this will give another reference to the Y-axis direction to compare with a second compass located near the proximal end 164 of the installation rod 160 outside the borehole 102.

The compass in the orientation sensor module 220 may be used to determine the direction of true North. The compass readings must be corrected for two effects, however. The first is magnetic declination or variation, which is the angular difference between magnetic North (the local direction of the Earth's magnetic field) and true North. The second is magnetic deviation, which is the angular difference between magnetic North and the compass needle due to nearby sources of interference such as magnetically permeable bodies or other magnetic fields within the field of influence. The magnetic deviation may be minimized by keeping the compass from any disturbing magnetic field (e.g., more than 18 inches from the magnetic head 150).

Figure 12:
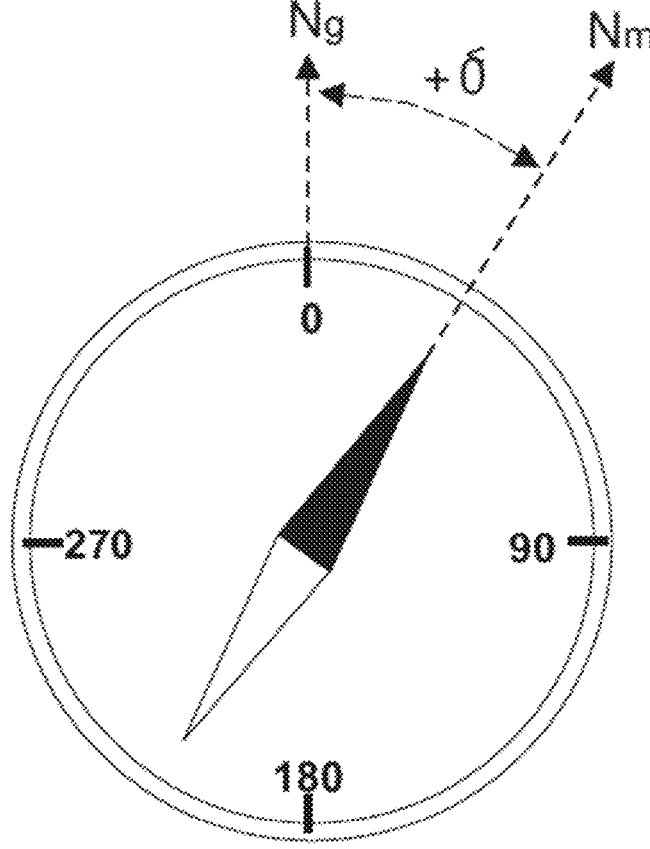
FIG. 12 is a view of a compass showing an example of magnetic declination. showing a compass needle with a positive (or easterly) variation from geographic North.

FIG. 12 is a view of a compass showing an example of magnetic declination. The compass needle has a positive (or easterly) variation from geographic North. $N_g$ is geographic or true North, $N_m$ is magnetic North, and δ is magnetic declination. For proper installation of the sensor device 110, the operator must take into account magnetic declination when reading the compass headings to know where the Y axis is pointed and either plotting directions on a map or entering directions in software.

Figure 13:
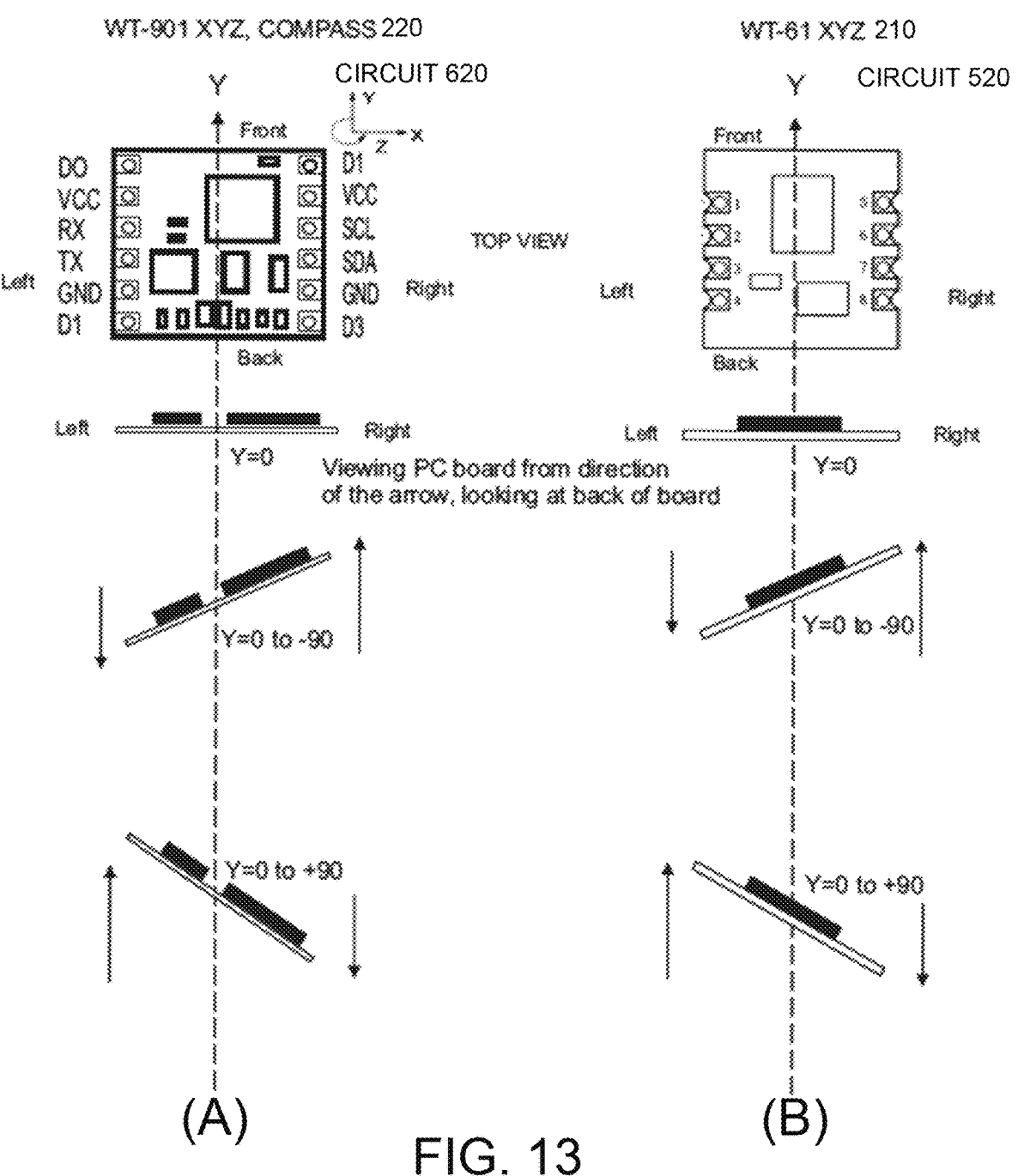
FIG. 13 is an example of tilt output values in the Y axis for (A) the orientation sensor circuit and (B) the tilt sensor circuit.

FIG. 13 is an example of tilt output values in the Y axis for (A) the orientation sensor circuit 620 and (B) the tilt sensor circuit 520. The output values are represented graphically by viewing the PC circuit board along the direction of the arrow at the back of the circuit (the tilt sensor circuit 520 for the tilt sensor 210 and the orientation sensor circuit 620 for the orientation sensor 220). FIG. 13 shows examples of Y=0, Y=0 to −90 and Y=0 to +90 in output values. The WT-61 circuit board shown for the tilt sensor circuit 520 is commercially available, but any suitable circuit may be used.

B FIG. 14 is an example of tilt output values in the X axis for (A) the orientation sensor circuit 620 and (B) the tilt sensor circuit 520. The output values are represented graphically by viewing the PC circuit board along the direction of the arrow at the left side of the circuit (the tilt sensor circuit 520 for the tilt sensor 210 and the orientation sensor circuit 620 for the orientation sensor 220). FIG. 14 shows examples of X=0, X=0 to −180 and X=0 to +180 in output values.

Sensor Device Installation Process

FIG. 15 is an example of a flow diagram 1500 illustrating a sensor device installation process using the installation apparatus 100. Step 1510 involves scoping and observing the borehole conditions and recording the depth of the borehole 102. Step 1520 involves detachably connecting the sensor device assembly 500 to the installation head 150 and the installation rod 160 and lowering the sensor device assembly into the borehole 102. Step 1530 involves lowering or delivering quick-setting concrete powder down the borehole 102. Step 1540 involves orientating the sensor device 110 inside the borehole. The sensor device 110 may be magnetically orientated and aligned by manipulating the installation rod 160 from outside the borehole 102 based on the compass and tilt sensor measurements from the tilt sensor 210 attached to the sensor assembly 500 and the compass and tilt (orientation) sensor 220 attached to the installation rod 160. The manipulating may include, for example, twisting around a vertical axis and/or moving the installation apparatus 100 back and forth laterally until the compass and tilt sensor show that the 3C sensor is in the correct alignment. Step 1550 involves adding water and waiting for the quick-setting concrete to set. The use of concrete is one way of setting the 3C sensor fixed in position inside the borehole 102. Other suitable methods may be used.

After setting of the concrete, step 1560 involves taking alignment measurements of the 3C sensor 110 again using the tilt sensor 210 and the orientation sensor 220. After confirming that the 3C sensor 110 is planted, step 1570 involves detaching the installation tool from the sensor device assembly 500 and pulling up the installation tool from the borehole. The detachment may make use of breakaway connections and/or quick disconnect connections or the like between the installation tool and the sensor device assembly 500. Step 1580 involves filling in the borehole 102 with native soil. Step 1590 involves recording the GPS location of the installed sensor device 110.

Compass Calibration and Tilt Sensors Calibration Processes

Figure 16:
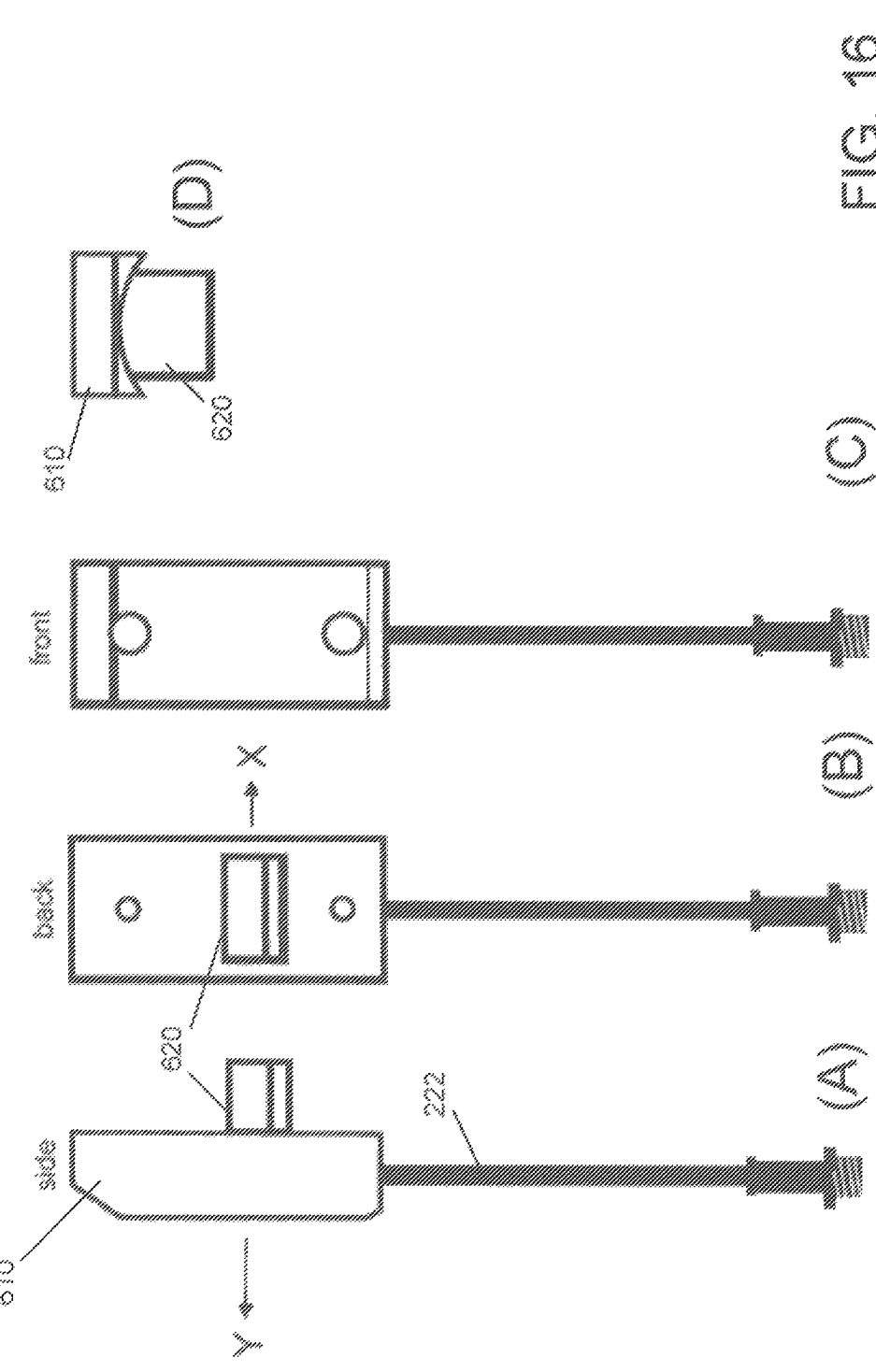
FIG. 16 shows the orientation sensor module to be calibrated, in (A) side view, (B) back view, (C) front view, and (D) top view.

FIG. 16 shows the orientation (compass and tilt) sensor module 220 to be calibrated, in (A) side view, (B) back view, (C) front view, and (D) top view. The orientation sensor circuit 620 is affixed to the coupling plate 610 of the orientation sensor 220. In this example, the Y axis of the orientation sensor 220 is configured to point to true North.

Magnetic field calibration is used to remove the magnetic field sensor's zero offset. Usually, the magnetic field sensor will have a large zero error when it is manufactured. If it is not calibrated, it may bring about a large measurement error and affect the accuracy of the Z-axis angle measurement of the heading angle.

Figure 17:
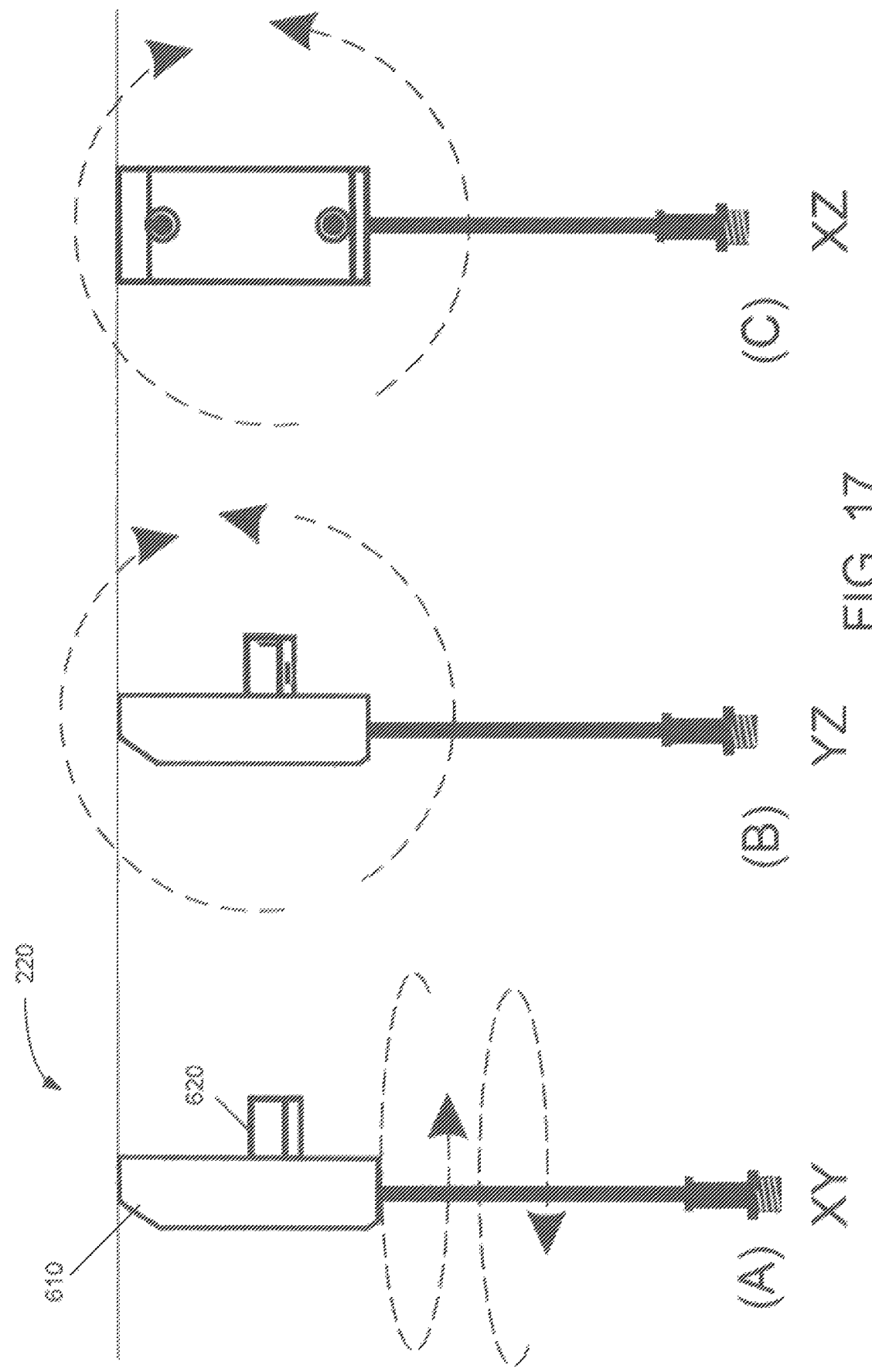
FIG. 17 shows rotation of the orientation sensor module for calibration on (A) the XY plane around the Z axis, (B) the YZ plane around the X axis, and (C) the XZ plane around the Y axis.

According to one embodiment of a calibration process, the first step is to connect the orientation sensor module 220 and the computer and place the orientation sensor module 220 far from any disturbing magnetic field (e.g., at least ten feet from large sources of ferromagnetic materials or 18 inches from items such as keys, cell phones, and the magnetic head 150 from magnets, iron, or the like) and then open a computer calibration software. The second step is to set up the computer software for calibration. Regardless of the commercial sensors used, the compass and tilt sensor devices should include software. For the example sensors shown in FIGS. 13, 14, 16, and 17, in the settings page, the operator clicks on the magnetic field button under the calibration bar to enter the magnetic field calibration mode. A window pops up and the calibration button is clicked or selected. Then the third step is to rotate the orientation sensor module 220 slowly around the three axes and let the data points draw points in the three planes. FIG. 17 shows rotation of the orientation sensor module 220 for calibration on (A) the XY plane around the Z axis, (B) the YZ plane around the X axis, and (C) the XZ plane around the Y axis. The orientation sensor module 220 is rotated by about 360° in rotational directions on each plane. For a specific computer software, the data points produce a regular ellipse in each of the three planes. After the calibration is completed, the operator may click on Write Parameters for the specific software program. Prior to performing the calibration procedure, the orientation sensor module 220 is removed from the installation bar 160 to allow the rotation of the orientation sensor module 220 around the three axes as illustrated in FIG. 17.

Figure 18:
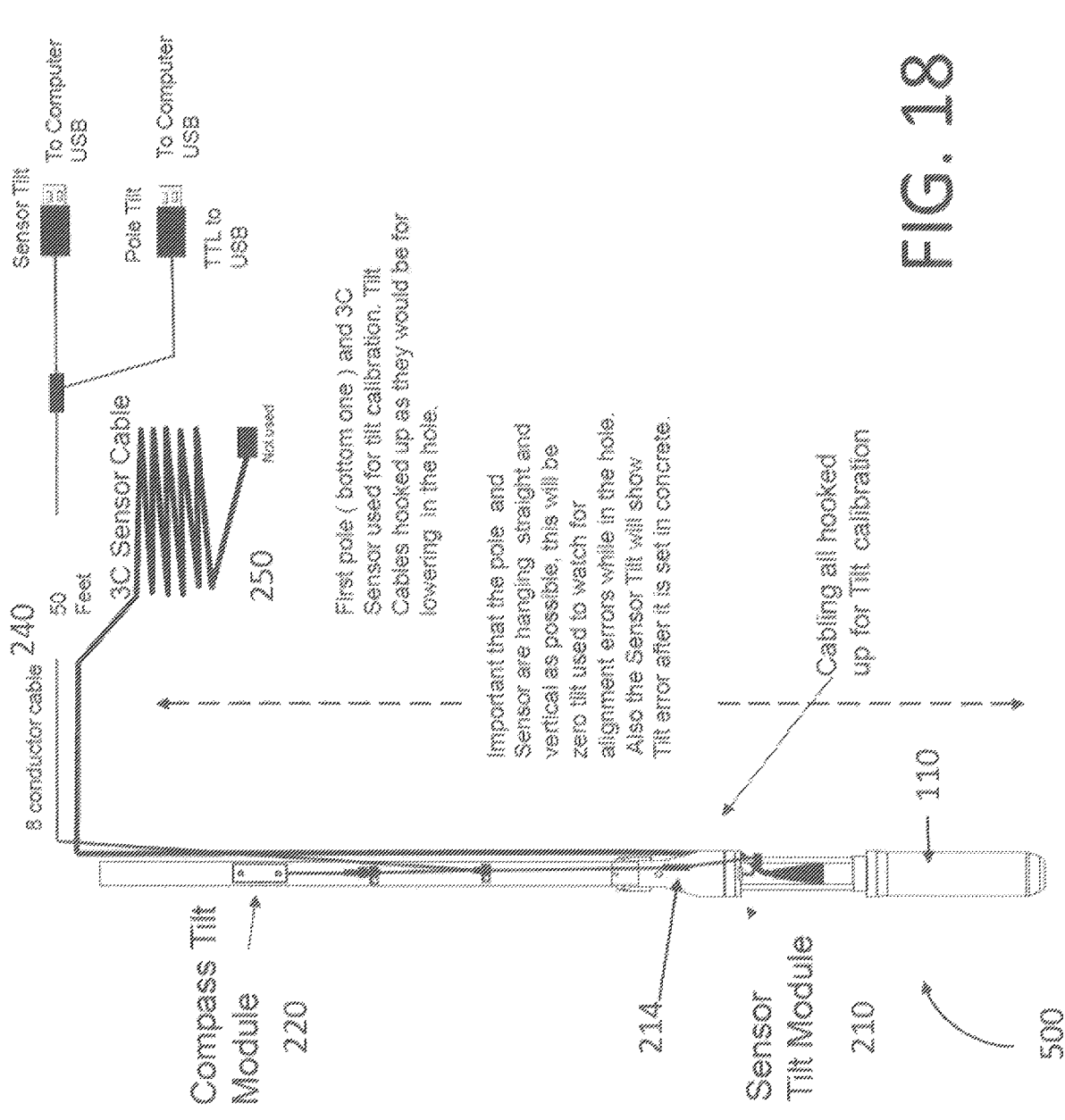
FIG. 18 shows the sensor device assembly and the installation tool set up for tilt calibration.

FIG. 18 shows the sensor device assembly 500 and the installation tool set up for tilt calibration. The installation tool includes the installation bar 160 with the compass and tilt sensor module 220 attached thereto. The tilt sensor module 210 attached to the sensor device assembly is connected via a quick disconnect 214 to a conductor cable 240. The compass and tilt sensor module 220 is also connected to the conductor cable 240, which is connected to the computer at the surface via a pair of TTL to USB modules to provide communication between the computer and the tilt sensor module 210 and the compass and tilt sensor module 220, respectively. The sensor device cable 250 (e.g., geophone cable cable) is not used in the tilt calibration process. The tilt calibration involves angle X around the X axis and angle Y around the Y axis.

For X and Y tilt calibrations, it is important that (i) the tilt sensor module 210 and the compass and tilt sensor module 220 are mounted, (ii) the installation bar 160 is attached to the sensor device assembly 500 containing the sensor device 110 in an installation configuration as shown, (iii) the compass of the compass and tilt sensor module 220 is installed, and (iv) the installation bar and the sensor modules 210, 220 are hanging as straight and vertical as possible so as to provide Zero Tilt which is used to check for alignment errors while the installation bar is in the borehole 102. The tilt sensor module 210 will show tilt error after it is set in concrete. A software program may be used to set the sensor tilt of the sensor device 110 to zero and set the sensor tilt of the compass and tilt sensor 220 to zero. This can then be used as a reference to determine if the tilt of the sensor device 110 and the tilt of the compass and tilt sensor 220 are lined up and the same. If they are not, the software will show the alignment error as they are lowered into the borehole 102.

Compass and Tilt Sensors Calibration Apparatus and Method of Operation

Figure 19:
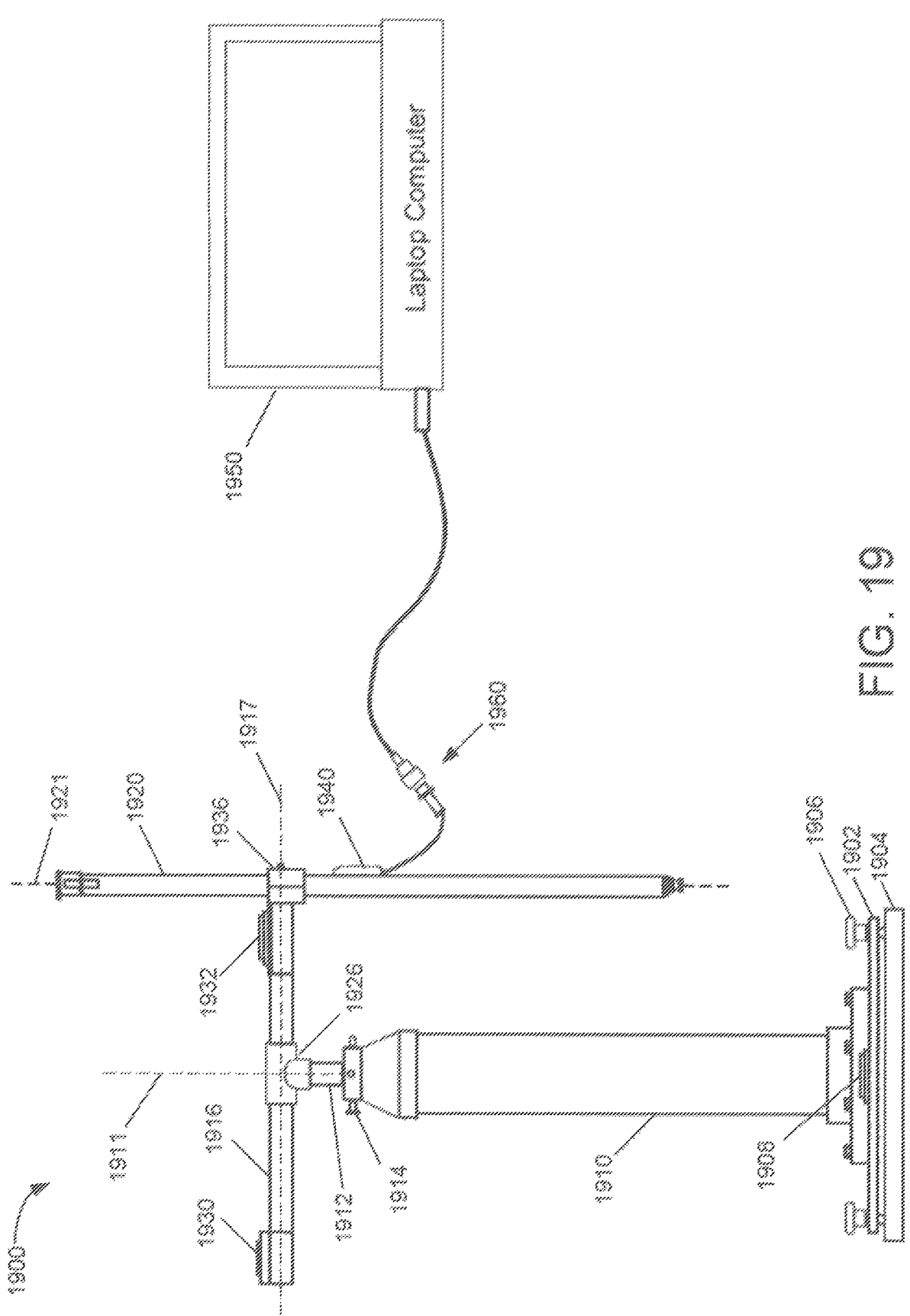
FIG. 19 is an elevational view showing an example of a compass and tilt sensor calibration fixture or apparatus for calibrating the compass and tilt sensor assembly.

FIG. 19 is an elevational view showing an example of a compass and tilt sensor calibration fixture or apparatus 1900 for calibrating the compass and tilt sensor assembly 220. The calibration fixture 1900 includes a calibration platform or support 1902 disposed on a base 1904. A plurality of leveling adjustment members 1906 are spaced apart from one another and coupled to the calibration support 1902 to adjust the calibration support 1902, using a bubble level 1908, for leveling of a longitudinal support 1910 having a longitudinal support axis 1911. The calibration support 1902 is connected or attached to the longitudinal support 1910 and may be a planar support lying on a plane to provide planar support to the longitudinal support 1910 on the plane perpendicular to the longitudinal support axis 1911.

In one embodiment, the support comprises a support plate 1902. The plurality of leveling adjustment members include three or more leveling feet screws 1906 configured to attach the support plate 1902 to the base 1904. Each leveling feet screw 1906 adjusts a spacing between the support plate 1902 and the base 1904 at a corresponding location of the leveling feet screw 1906. In the embodiment, the plane of the support plate 1902 may be a horizontal plane and the longitudinal support axis may be a vertical axis 1911.

A first longitudinal member 1912 is rotatably coupled to the longitudinal support 1910 to be rotatable around the longitudinal support axis 1911 relative to the longitudinal support 1910. For example, the first longitudinal member 1912 is a shaft oriented along a first longitudinal member axis which coincides with the longitudinal support axis 1911. The longitudinal support 1910 has a hollow interior in which the first longitudinal member 1912 is rotatably disposed. A shaft locking pin 1914 may be provided to releasably lock the shaft 1912 with respect to the longitudinal support 1910 to prevent relative rotation therebetween.

A second longitudinal member 1916 is connected to the first longitudinal member 1912 to be slidable along a second longitudinal member axis 1917 and be rotatable around the second longitudinal member axis 1917 relative to the first longitudinal member 1912, and to be rotatable with the first longitudinal member 1912 around the longitudinal support axis 1911 relative to the longitudinal support 1910. The second longitudinal member axis 1917 is perpendicular to the longitudinal support axis 1911. The planar support 1902 is perpendicular to the longitudinal support axis 1911 and parallel to the second longitudinal member axis 1917.

A third longitudinal member 1920 is rotatably coupled to the second longitudinal member 1916 to be rotatable around a third longitudinal member axis 1921 relative to the second longitudinal member 1916, to be slidable and rotatable with the second longitudinal member 1916 relative to the first longitudinal member 1912, and to be rotatable with the first longitudinal member 1912 around the longitudinal support axis 1911 relative to the longitudinal support 1910. The third longitudinal axis 1921 is perpendicular to the second longitudinal member axis 1917. It may be parallel to the longitudinal support axis 1911 in a default or neutral position as seen in FIG. 19.

Figure 20:
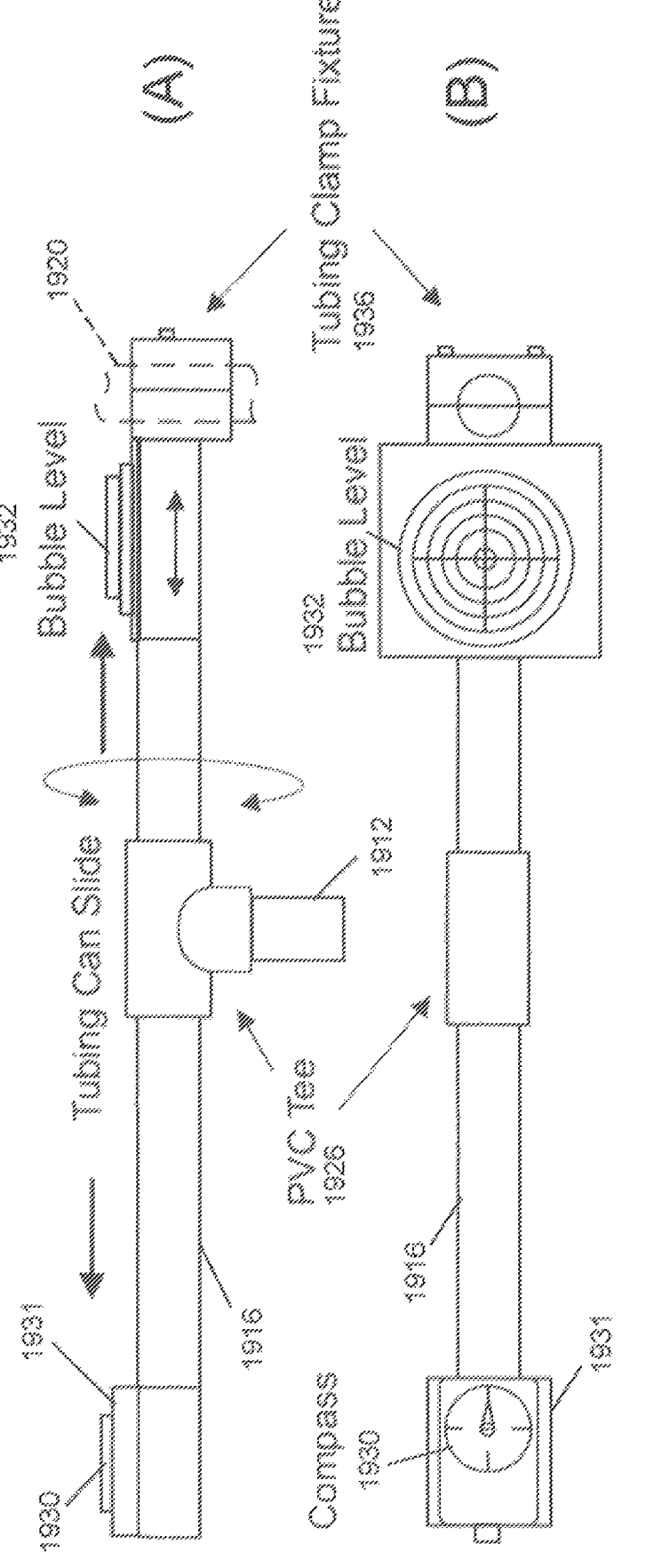
FIG. 20 shows close-up views of the second longitudinal member including (A) an elevational view and (B) a top plan view.

FIG. 20 shows close-up views of the second longitudinal member 1916 including (A) an elevational view and (B) a top plan view. The first longitudinal member 1912 may be attached to a T-connector 1926 such as a PVC Tee to slidably receive the second longitudinal member 1916 which is a bar oriented along the second longitudinal member axis 1917. The T-connector 1926 has a hollow interior to connect slidably with the bar 1916. A reference compass 1930 may be attached to the second longitudinal member 1916 to be slidable and rotatable with the second longitudinal member 1916 relative to the first longitudinal member 1912. The slidable feature of the second longitudinal member 1916 allows for balance adjustment of the second longitudinal member 1916 relative to the first longitudinal member 1912 (at the T-connector 1926) when the third longitudinal member 1920 is clamped for calibration and testing. It may not be a required feature but rather an optional or desirable feature in some embodiments. The second longitudinal member 1916 can rotate in the T-connector 1926 in the clockwise (CW) and counter-clockwise (CCW) directions around the second longitudinal member axis 1917. The reference compass 1930 may be held in place in a compass holder 1931 provided on the second longitudinal member 1916 using a Velcro buckle strap or the like to prevent it from falling off. A foam strip may be attached to the Velcro buckle strap to make contact with the upper surface of the reference compass 1930 as the strap is applied to hold it in place.

The slidable connection between the T-connector 1926 and the second longitudinal member 1916 provides a mechanism or means for adjusting a position of the second longitudinal member 1916 relative to the first longitudinal member 1912 to balance the second longitudinal member 1916 with the third longitudinal member 1020 coupled thereto. A locking pin similar to the shaft locking pin 1914 or some other tightening or locking mechanism may be used in conjunction with the T-connector 1926 to releasably lock the second longitudinal member 1916 to the T-connector 1926.

The calibration apparatus 1900 provides a mechanism or means for connecting the first longitudinal member 1912, the second longitudinal member 1916, and the third longitudinal member 1920, to rotate independently the module 1940 attached thereto around three vertical axes of the module 1940.

In one embodiment, the reference compass 1930 is attached to the bar 1916 at a location away from the third longitudinal member 1920 on an opposite side of the second longitudinal member 1916. The reference compass 1930 may be an analog compass used to verify the calibration. One can set the compass on the module 1940 to be calibrated to any desired heading and then verify that the reference compass 1930 on the bar 1916 is in agreement. A bubble level 1932 is coupled with or attached to the second longitudinal member 1916 to level the second longitudinal member 1916 relative to the plane of the planar support 1902.

The bar 1916 is attached to a clamp 1936 to releasably clamp the third longitudinal member 1920. The third longitudinal member 1920 is a rod oriented along the third longitudinal member axis 1921 to be rotatable around the third longitudinal member axis 1921 relative to the bar 1916 between rotational positions of the rod 1920 by releasing the clamp 1936 from the rod 1920, rotating the rod 1920, and reengaging the clamp 1936 on the rod 1920.

The unit or module 1940 to be calibrated may include a compass and/or a tilt sensor such as the compass and tilt sensor module 220. The module 1940 is connected or attached to the third longitudinal member 1920 to be rotatable with the third longitudinal member 1920 around the third longitudinal member axis 1921 relative to the second longitudinal member 1916, to be slidable and rotatable with the second longitudinal member 1916 relative to the first longitudinal member 1912, and to be rotatable with the first longitudinal member 1912 around the longitudinal support axis 1911 relative to the longitudinal support 1910. The module 1940 is coupled to a computer 1950 for communication using, for instance, a male-female connector 1960 as TTL to USB cable which is connected to the computer 1950. The computer 1950 is used to execute software for calibrating the compass and/or tilt sensor of the module 1940.

Figure 21:
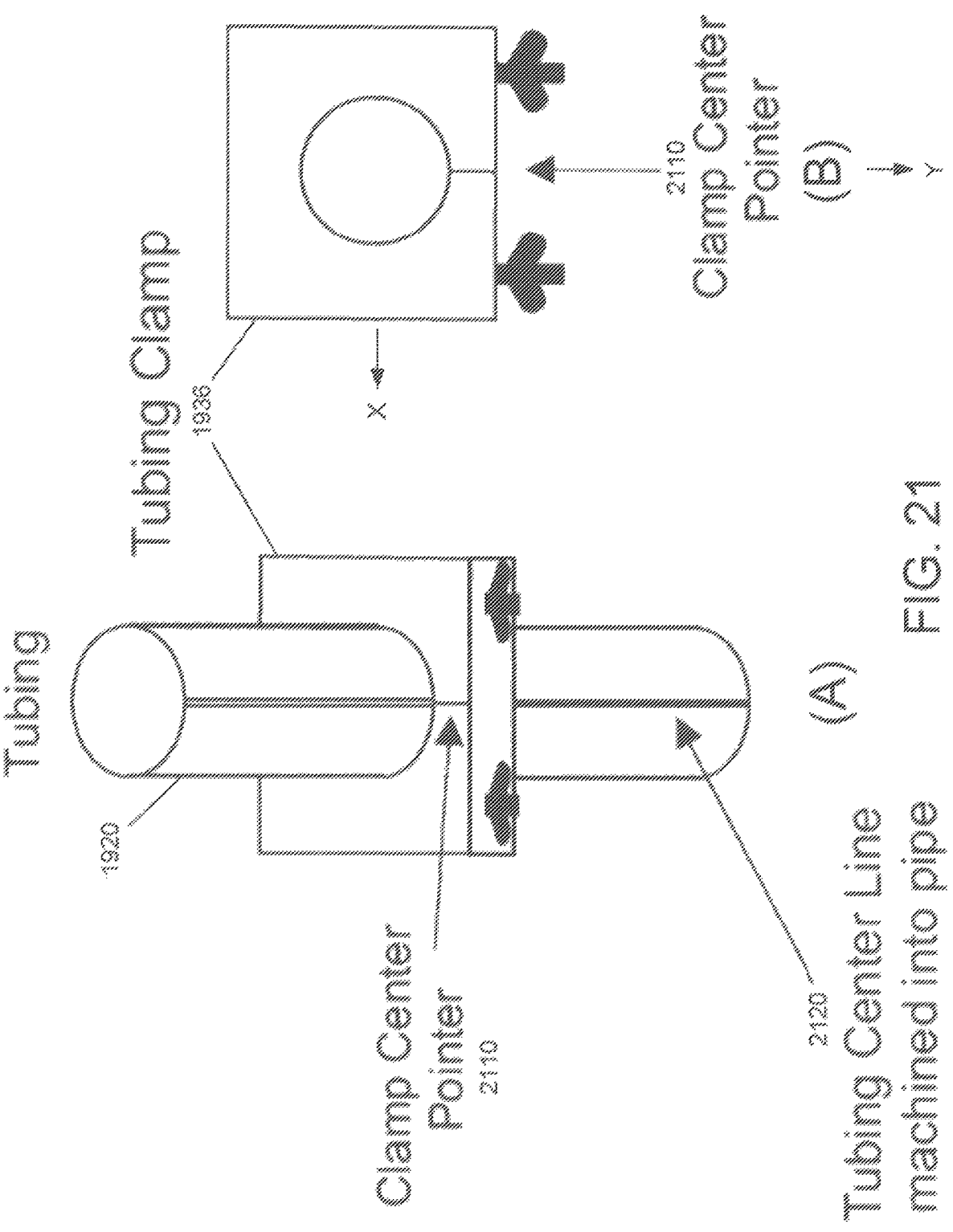
FIG. 21 shows close-up views of the third longitudinal member and the clamp including (A) an angled elevational view and (B) a top plan view.

The T-connector 1926 and the clamp 1936 provide a mechanism or means for keeping the second longitudinal member 1916 fixed relative to the first longitudinal member 1912 and keeping the third longitudinal member 1920 fixed relative to the second longitudinal member 1916, to allow the first longitudinal member 1912 to rotate around the first longitudinal member axis which coincides with the longitudinal support axis 1911, with the third longitudinal member 1920 at a first orientation as discussed below (see FIG. 21).

Figure 22:
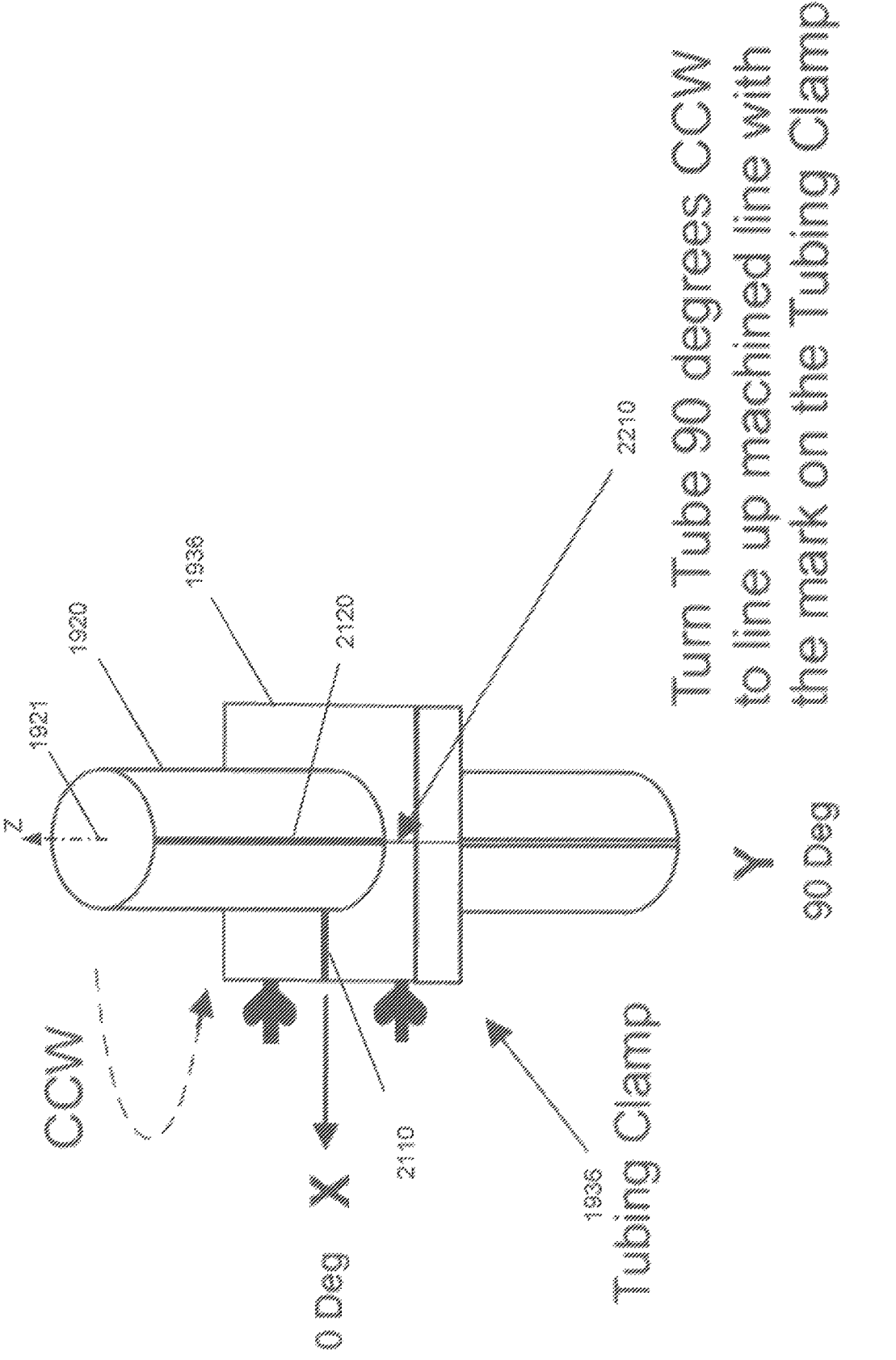
FIG. 22 shows a second orientation of the module in which the center line of the third longitudinal member is rotated CCW by 90° with respect to the Z axis of the module.
Figure 27:
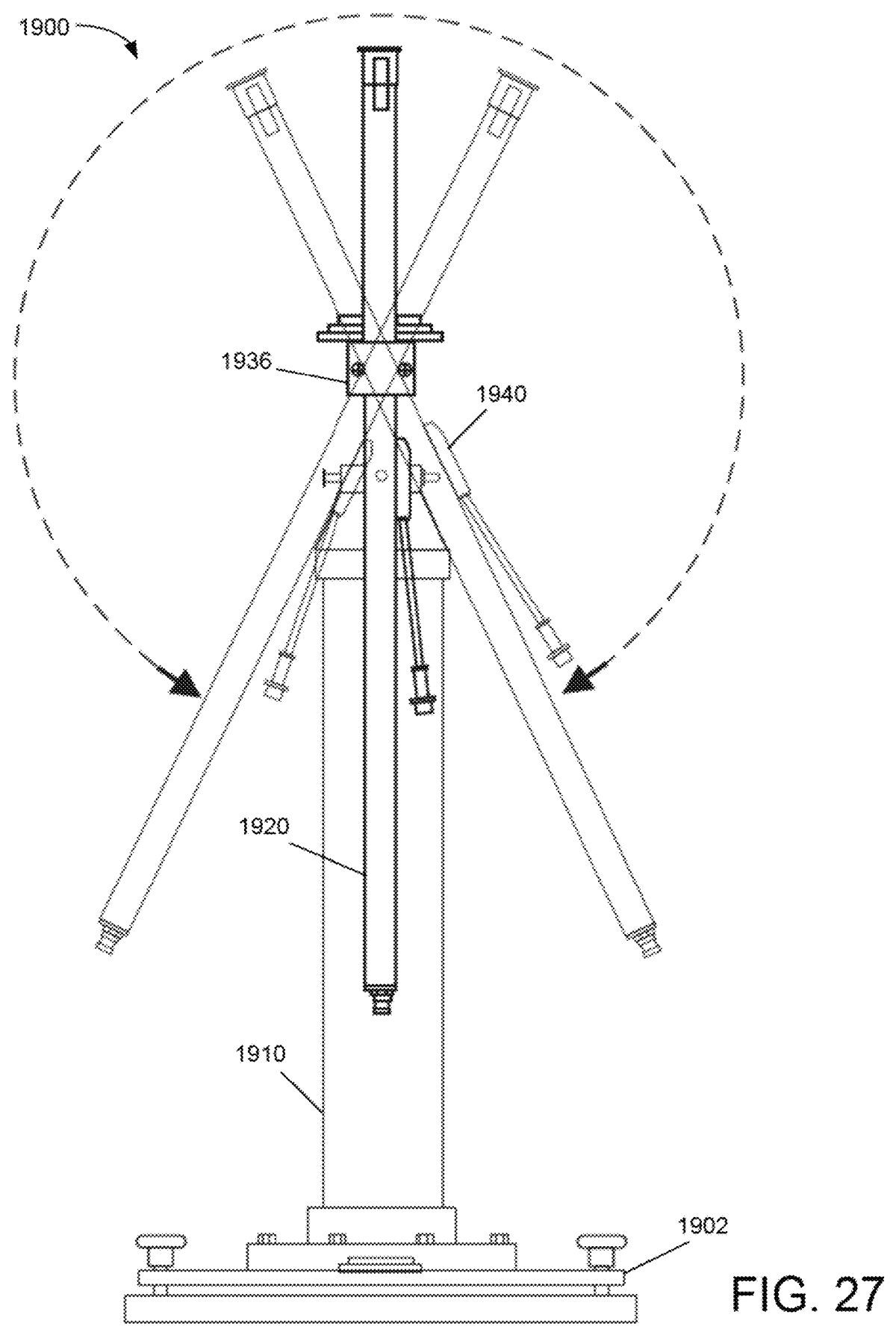

The longitudinal support 1910, the shaft locking pin 1914, and the clamp 1936 provide a mechanism or means for keeping the first longitudinal member 1912 fixed relative to the first longitudinal member axis (coinciding with longitudinal support axis 1911) and keeping the third longitudinal member 1920 fixed relative to the second longitudinal member 1916, to allow the second longitudinal member 1916 to rotate around the second longitudinal member axis 1917 with the third longitudinal member 1920 fixed relative to the second longitudinal member 1917 at the first orientation (see FIGS. 21 and 25) or the second orientation (see FIGS. 22 and 27).

FIG. 21 shows close-up views of the third longitudinal member 1920 and the clamp 1936 including (A) an angled elevational view and (B) a top plan view. The third longitudinal member axis 1921 is aligned with the Z axis of the module 1940 which is perpendicular to an X-Y plane thereof. The third longitudinal member 1920 may include a center line 2120 machined into the outer surface of the pipe or rod. The module 1940 to be calibrated is attached to the third longitudinal member 1920 with the Y axis of the module 1940 (e.g., 3C sensor 110 or orientation sensor 220) intersecting the center line 2120. The clamp 1936 may include a clamp center pointer 2110 that can be used to line up with the center line 2120 of the third longitudinal member 1920.

FIG. 21 shows a first orientation in which the center line 2120 of the third longitudinal member 1920 is lined up with the clamp center pointer 2110 of the clamp 1936. The module 1940 to be calibrated is oriented with the Y axis intersecting the center line 2120 and the Y axis is aligned with the second longitudinal member axis 1917 in this first orientation.

FIG. 22 shows a second orientation of the module 1940 in which the center line 2120 of the third longitudinal member 1920 is rotated CCW by 90° with respect to the Z axis of the module 1940. The center line 2120 of the third longitudinal member 1920 is 90° CCW relative to the clamp center pointer 2110 of the clamp 1936. The center line 2120 may be lined up with a 90° CCW mark 2210 on the clamp 1936 which is 90° CCW from the clamp center pointer 2110. As such, the Y axis of the module 1940 is 90° CCW relative to the clamp center pointer 2110 of the clamp 1936. In this second orientation, the X axis of the module 1940 intersects the center line 2120 and is aligned with the second longitudinal member axis 1917. The releasable clamp 1936 provides a mechanism or means for allowing the third longitudinal member 1920 to be turned around the third longitudinal member axis 1921 from the first orientation by 90° to the second orientation.

Figure 23:
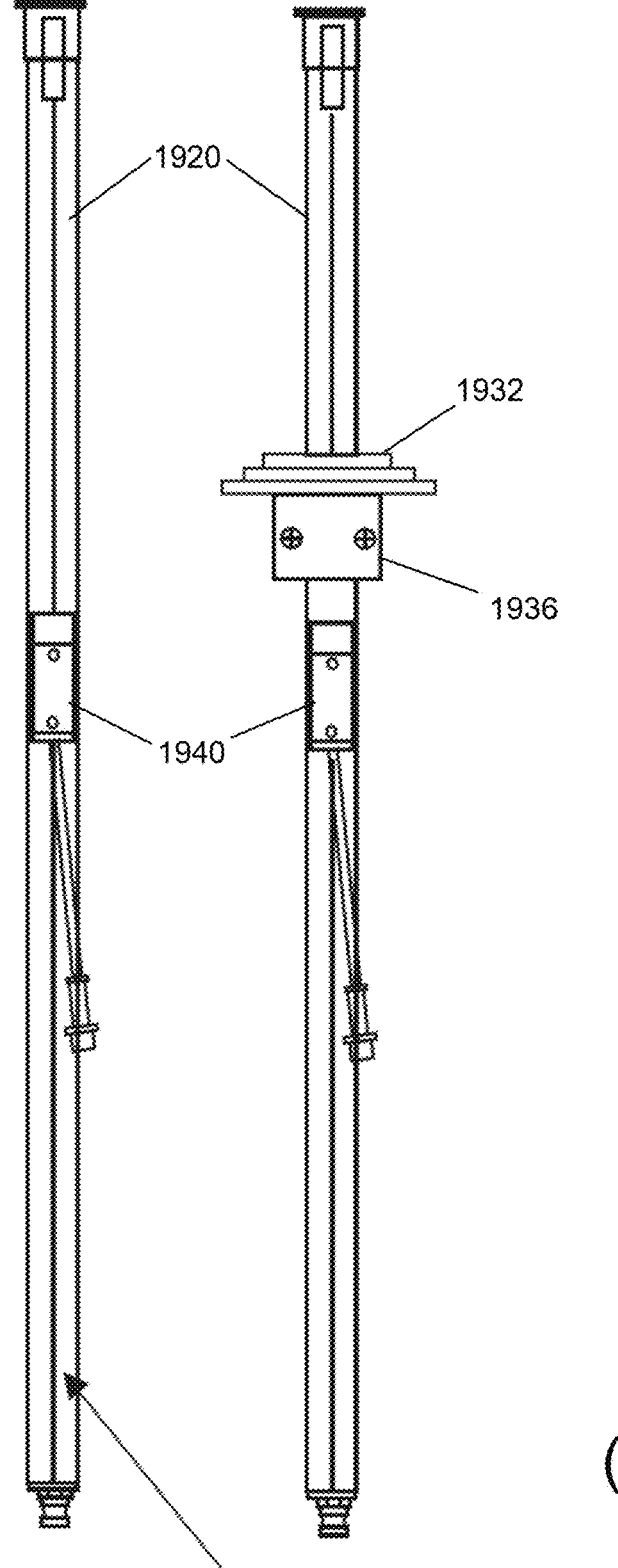
FIG. 23 illustrates the third longitudinal member with the center line and the attached module to be calibrated, including (A) an elevational view along the second longitudinal member axis and (B) an elevational view showing the clamp releasably clamping the third longitudinal member to the second longitudinal member.

FIG. 23 illustrates the third longitudinal member 1920 with the center line 2120 and the attached module 1940 to be calibrated, including (A) an elevational view along the second longitudinal member axis 1917 and (B) an elevational view showing the clamp 1936 releasably clamping the third longitudinal member 1920 to the second longitudinal member 1916.

Figure 24:
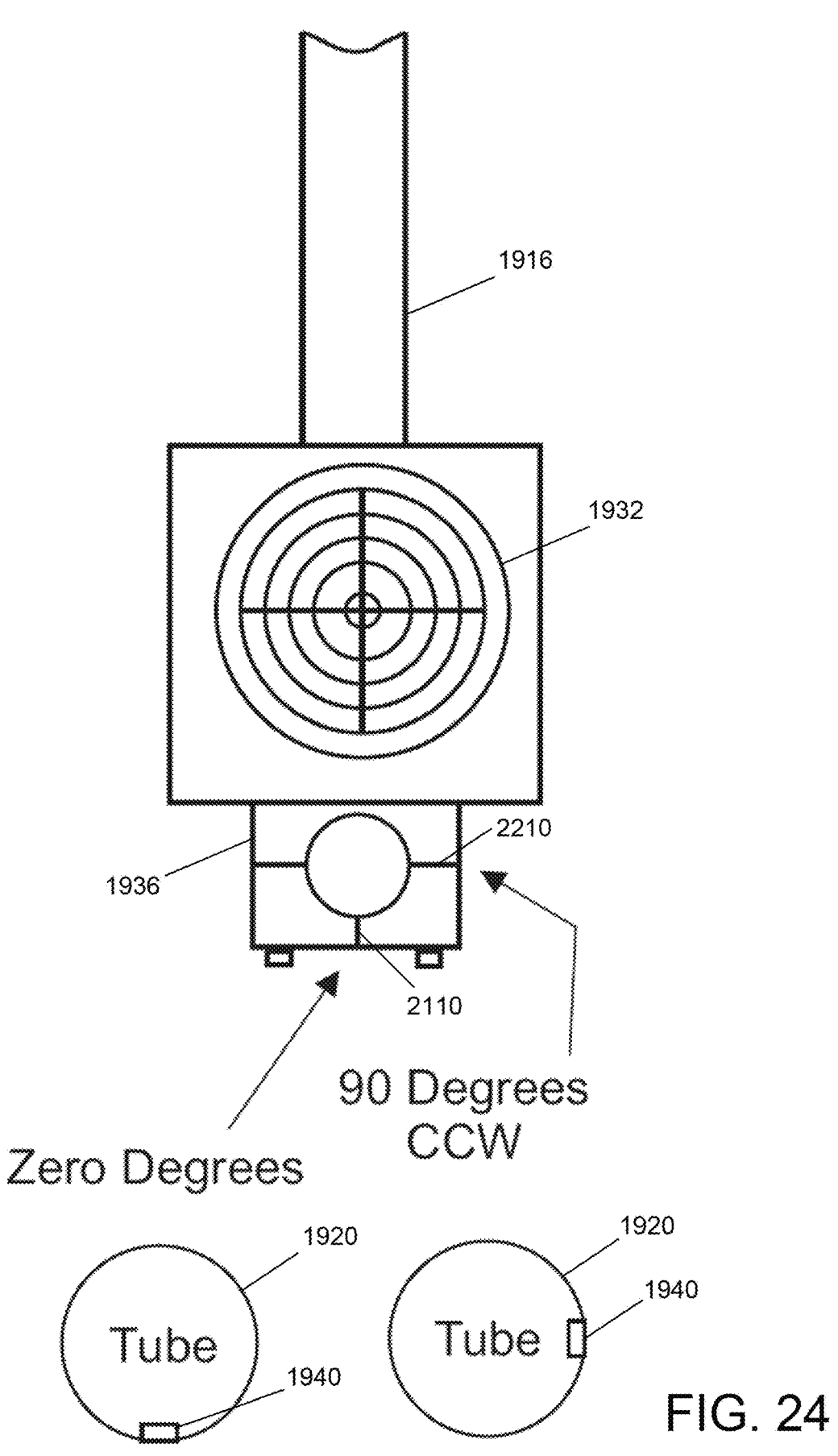
FIG. 24 is a close-up top plan view of the second longitudinal member showing the bubble level and the clamp for releasably clamping the third longitudinal member.

FIG. 24 is a close-up top plan view of the second longitudinal member 1916 showing the bubble level 1932 and the clamp 1936 for releasably clamping the third longitudinal member 1920. The clamp 1936 includes the clamp center pointer 2110 for orienting the module 1940 to be calibrated in the first orientation (see FIG. 21) and the 90° CCW mark 2210 for orienting the module 1940 in the second orientation (see FIG. 22).

Figure 25:
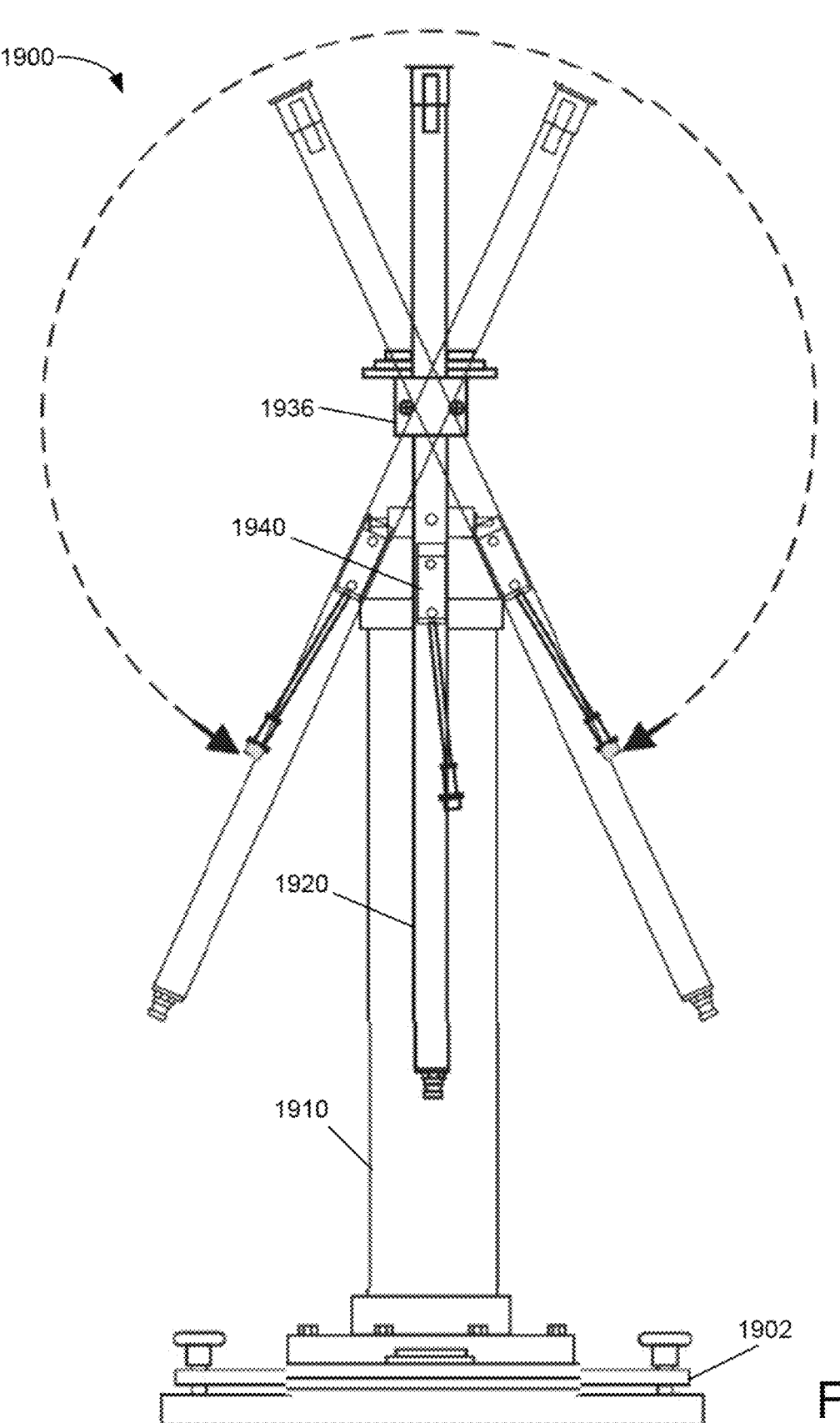
FIG. 25 illustrates an example of Y calibration of the module using the calibration apparatus.

FIG. 25 illustrates an example of Y calibration of the module 1940 using the calibration apparatus 1900. The first longitudinal member 1912 is kept stationary relative to the longitudinal support 1910. The second longitudinal member 1916 is free to rotate around the second longitudinal member axis 1917. The third longitudinal member 1920 rotates with the second longitudinal member 1916 around the second longitudinal member axis 1917 as shown.

Figure 26B:
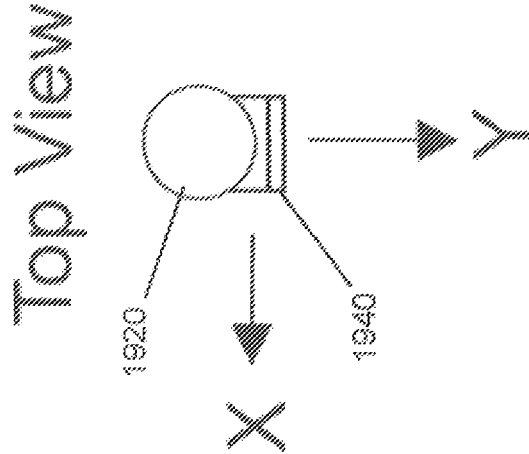
FIG. 26B shows a top plan view thereof.
Figure 26A:
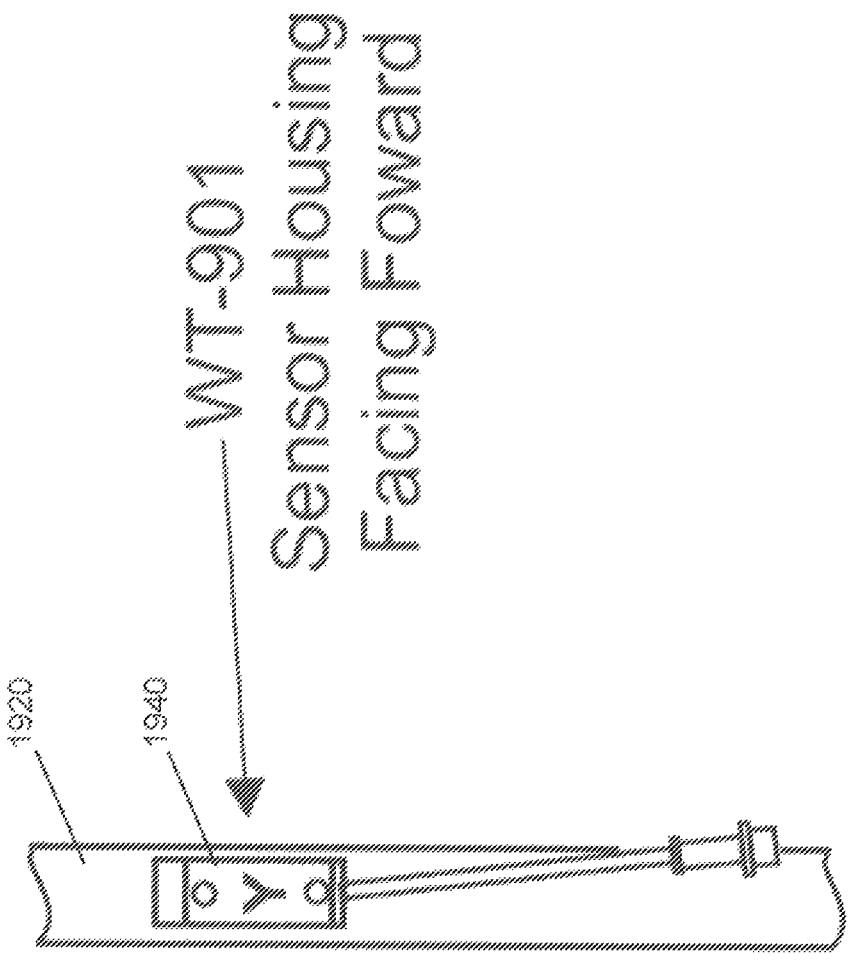
FIG. 26A shows a close-up view of the module to be calibrated which is attached to the third longitudinal member in the first orientation of FIG. 25.

FIG. 26A shows a close-up view of the module 1940 to be calibrated which is attached to the third longitudinal member 1920 in the first orientation of FIG. 25. FIG. 26B shows a top plan view thereof. In this setup, the Y axis of the module 1940 to be calibrated faces outward and is aligned with the second longitudinal member axis 1917. The third longitudinal member 1920 rotates with the second longitudinal member 1916 to rotate the module 1940 around the Y axis CW and CCW by about 360° (e.g., within ±3.6° or more preferably within ±1.8°).

FIG. 27 illustrates an example of X calibration of the module 1940 using the calibration apparatus 1900. Again, the first longitudinal member 1912 is kept stationary relative to the longitudinal support 1910, the second longitudinal member 1916 is free to rotate around the second longitudinal member axis 1917, and the third longitudinal member 1920 rotates with the second longitudinal member 1916 around the second longitudinal member axis 1917.

Figures 28A, 28B:
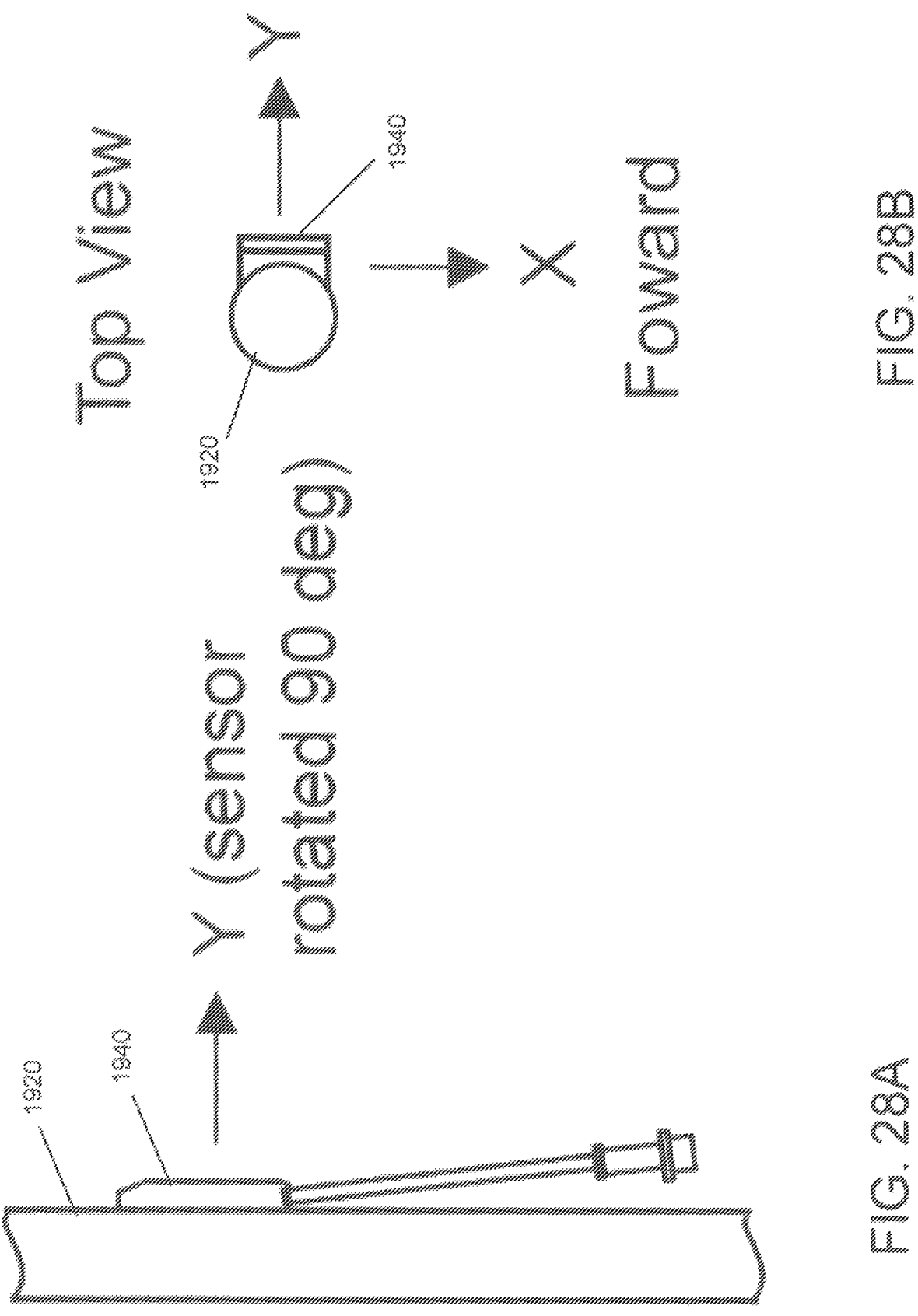
FIG. 28A shows a close-up view of the module to be calibrated which is attached to the third longitudinal member in the second orientation of FIG. 27.
FIG. 28B shows a top plan view thereof.

FIG. 28A shows a close-up view of the module 1940 to be calibrated which is attached to the third longitudinal member 1920 in the second orientation of FIG. 27. FIG. 28B shows a top plan view thereof. In this setup, the Y axis of the module 1940 to be calibrated faces 90° to the side after releasing the clamp 1936, rotating the third longitudinal member 1920 CCW 90°, and reapplying the clamp 1936 on the third longitudinal member 1920. Instead, the X axis of the module 1940 faces outward and is aligned with the second longitudinal member axis 1917. The third longitudinal member 1920 rotates with the second longitudinal member 1916 to rotate the module 1940 around the X axis CW and CCW by about 360°.

Figure 29:
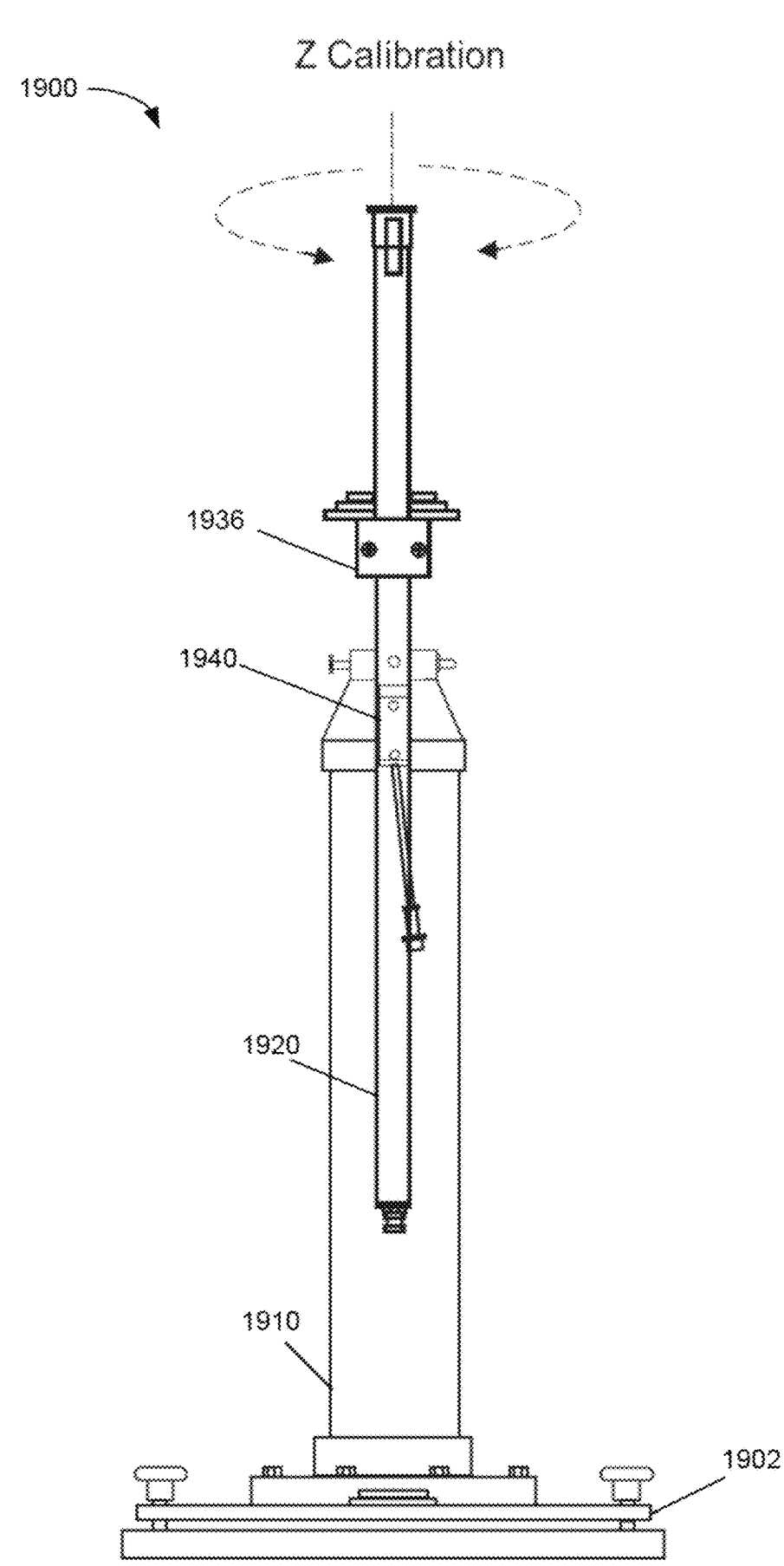
FIG. 29 illustrates an example of Z calibration of the module using the calibration apparatus.

FIG. 29 illustrates an example of Z calibration of the module 1940 using the calibration apparatus 1900. The second longitudinal member 1916 and the third longitudinal member 1920 are fixed with respect to the first longitudinal member 1912. The first longitudinal member 1912 is rotated about 360° CW and CCW relative to the longitudinal support 1910 around the longitudinal support axis 1911 which is parallel to the Z axis of the module 1940. For Z calibration, the Y axis of the module 1940 may face outward (see FIGS. 26A and 26B).

Figure 30:
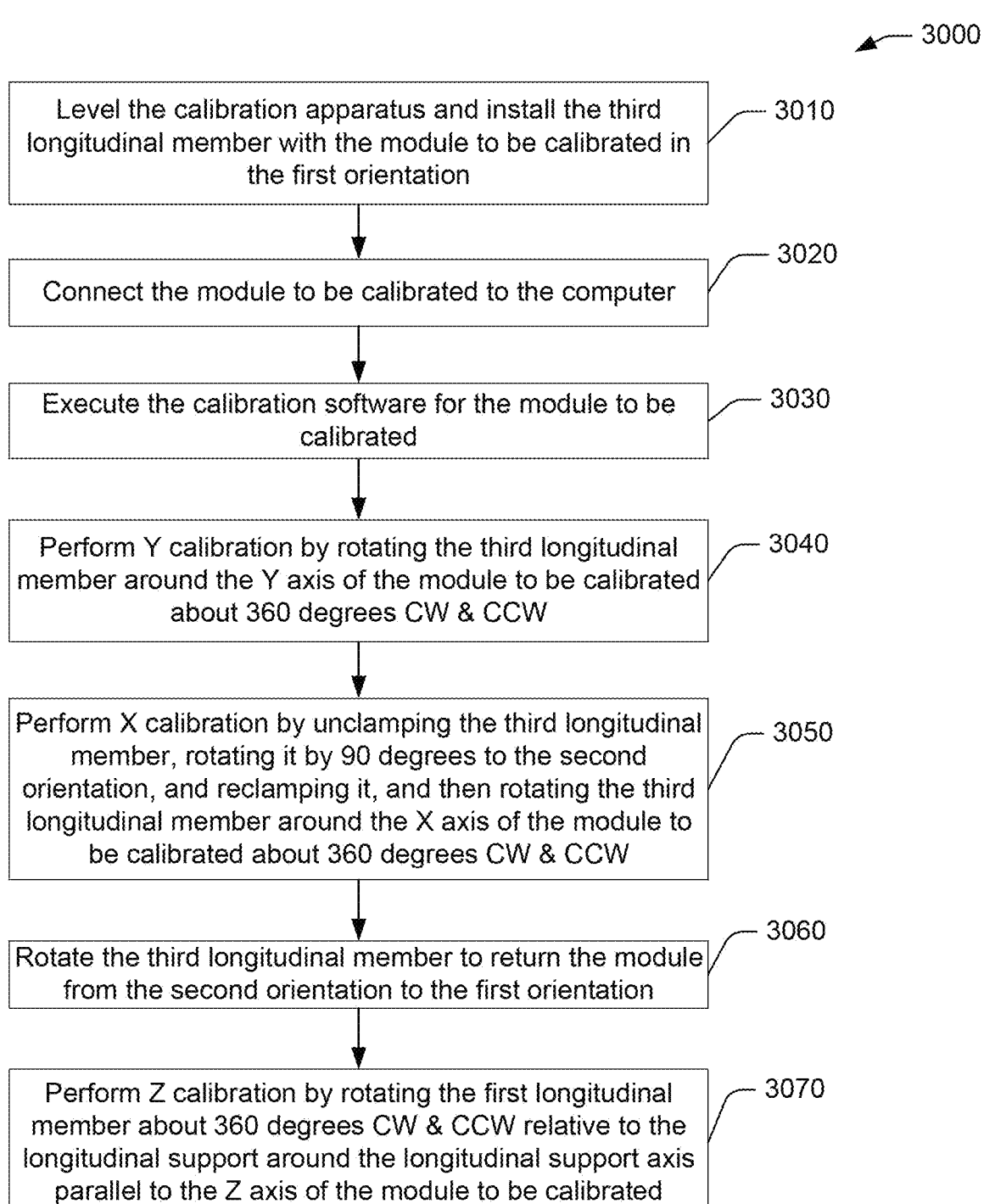
FIG. 30 is a flow diagram illustrating an embodiment of performing compass and/or tilt sensor calibration using the calibration apparatus or fixture in conjunction with compass and/or tilt sensor calibration software of the computer.

FIG. 30 is a flow diagram illustrating an embodiment of performing compass and/or tilt sensor calibration using the calibration apparatus or fixture 1900 in conjunction with compass and/or tilt sensor calibration software of the computer 1950.

Step 3010 involves leveling the calibration apparatus 1900 and installing the third longitudinal member 1920 with the module 1940 to be calibrated in the first orientation (see FIGS. 21, 27, 28A, and 28B). In step 3020, the module 1940 is connected to the computer 1950, for instance, by making the TTL to USB cable connection 1960 and connecting the TTL USB cable's USB connector to the computer's USB input. Step 3030 involves executing the calibration software for the module 1940 to be calibrated as described above. The reference compass 1930 attached to the second longitudinal member 1916 is used to verify the calibration as described above.

In step 3040, Y calibration is performed by rotating the third longitudinal member 1920 around the Y axis of the module 1940 to be calibrated about 360° CW and CCW (see FIGS. 25, 26A, and 26B).

In step 3050, X calibration is performed by unclamping the third longitudinal member 1920 from the clamp 1936, rotating the third longitudinal member 1920 and the module 1940 attached thereto by 90° from the first orientation to the second orientation of the module 1940, and re-clamping the third longitudinal member 1920 to the clamp 1936, and then rotating the third longitudinal member 1920 around the X axis of the module 1940 in the second orientation about 360° CW and CCW (see FIGS. 27, 28A, and 28B). In step 3060, the third longitudinal member is rotated to return the module 1940 from the second orientation to the first orientation.

In step 3070, Z calibration is performed by rotating the first longitudinal member 1912 about 360° CW and CCW relative to the longitudinal support 1910 around the longitudinal support axis 1911 which is parallel to the Z axis of the module 1940 to be calibrated. The second longitudinal member 1916, the third longitudinal member 1920, and the module 1940 rotate with the first longitudinal member 1912.

As described above, with the TTL to USB cable module 1960 plugged into the computer 1950 and both red LEDs on, the operator opens the tilt sensor software on the computer. On the tilt sensor software screen, the angle X and angle Y readings most likely will not be zero and will have to be set to zero according to a zeroing procedure. The operator will make sure that the level 1908 shows that the calibration fixture 1900 is level in the X and Y directions, which can be done by adjusting the level adjustment knobs or screws 1906. With the calibration fixture 1900 confirmed to be level, the tilt sensor can be calibrated to zero. The new calibration values can be stored in the tilt sensor circuit memory. The operator checks and makes sure that the calibration fixture is still level and has not changed, and the tilt calibration should be good and can be stored in the circuit board of the sensor device 1940. If the calibration fixture 1900 is not level, the operator adjusts the leveling knobs or screws 1906 to re-level the calibration fixture 1900 and repeat the zeroing procedure using the tilt sensor software.

After the tilt sensor zero calibration is complete, the operator closes the tilt sensor software. This is done so that when the next calibration is performed the software program will connect to the new tilt sensor circuit to be checked and calibrated. The operator further disconnects the TTL to USB cable module 1960 from the computer 1950. The tilt sensor calibration fixture 1900 is ready to test the next tilt sensor.

As will be appreciated by one of ordinary skill in the art, the present invention may be embodied as an apparatus (including, for example, a system, a machine, a device, and/or the like), as a method (including, for example, a business process, and/or the like), as a computer-readable storage medium, or as any combination of the foregoing.

Embodiments of the invention can be manifest in the form of methods and apparatuses for practicing those methods.

Unless explicitly stated otherwise, each numerical value and range should be interpreted as being approximate as if the word "about" or "approximately" preceded the value or range.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A calibration method for field calibration of a module having at least one of a compass or a tilt sensor, the calibration method comprising:
    rotatably coupling a first longitudinal member to a longitudinal support to be rotatable around a longitudinal support axis of the longitudinal support;

connecting a second longitudinal member to the first longitudinal member to be rotatable around a second longitudinal member axis relative to the first longitudinal member, and to be rotatable with the first longitudinal member around the longitudinal support axis relative to the longitudinal support, the second longitudinal member axis being perpendicular to the longitudinal support axis;

rotatably coupling a third longitudinal member to the second longitudinal member to be rotatable around a third longitudinal member axis relative to the second longitudinal member, to be rotatable with the second longitudinal member relative to the first longitudinal member, and to be rotatable with the first longitudinal member around the longitudinal support axis relative to the longitudinal support, the third longitudinal axis being perpendicular to the second longitudinal member axis;

connecting the module to the third longitudinal member to be rotatable with the third longitudinal member around the third longitudinal member axis relative to the second longitudinal member, to be rotatable with the second longitudinal member relative to the first longitudinal member, and to rotatable with the first longitudinal member around the longitudinal support axis relative to the longitudinal support;

connecting a support to the longitudinal support to provide planar support to the longitudinal support on a plane perpendicular to the longitudinal support axis;

coupling a plurality of leveling adjustment members, which are spaced apart from one another to the support to adjust the support for leveling of the longitudinal support relative to the plane which is perpendicular to the longitudinal support axis and parallel to the second longitudinal member axis;

leveling the second longitudinal member;

coupling communicatively the module to a computer to provide calibration data to the computer executing a computer calibration software; and generating the calibration data by:
    rotating the first longitudinal member around the longitudinal support axis while keeping the second longitudinal member fixed relative to the first longitudinal member and keeping the third longitudinal member fixed relative to the second longitudinal member at a first orientation;
    rotating the second longitudinal member around the second longitudinal member axis while keeping the first longitudinal member fixed relative to the longitudinal support and keeping the third longitudinal member fixed relative to the second longitudinal member; and
    turning the third longitudinal member around the third longitudinal member axis from the first orientation by 90° to a second orientation and rotating the second longitudinal member around the second longitudinal member axis while keeping the first longitudinal member fixed relative to the longitudinal support and keeping the third longitudinal member fixed relative to the second longitudinal member at the second orientation.

2. The calibration method of claim 1, wherein generating the calibration data comprises:
    rotating the first longitudinal member around the longitudinal support axis by about 360° clockwise (CW) and counterclockwise (CCW) while keeping the second longitudinal member fixed relative to the first longitudinal member and keeping the third longitudinal member fixed relative to the second longitudinal member at the first orientation;

rotating the second longitudinal member around the second longitudinal member axis by about 360° CW and CCW; and rotating the second longitudinal member around the second longitudinal member axis by about 360° CW and CCW while keeping the first longitudinal member fixed relative to the longitudinal support and keeping the third longitudinal member fixed relative to the second longitudinal member at the second orientation.

3. The calibration method of claim 2, wherein the module to be calibrated includes a compass, the method further comprising:

attaching a reference compass to the second longitudinal member; and comparing a reading of the compass of the module and a reading of the reference compass to verify or not verify calibration of the module based on the comparing.

4. The calibration method of claim 1, wherein the support comprises a support plate; and wherein the plane is a horizontal plane and the longitudinal support axis is a vertical axis.

5. The calibration method of claim 1, further comprising:

sliding the second longitudinal member along the second longitudinal member axis relative to the first longitudinal member to balance the second longitudinal member with the third longitudinal member coupled thereto.

*     *     *     *     *